US012735584B2

(12) United States Patent
Tsunematsu et al.

(10) Patent No.: US 12,735,584 B2
(45) Date of Patent: Sep. 15, 2026

(54) NEAR-INFRARED CURABLE INK COMPOSITION, NEAR-INFRARED CURED FILM, METHOD FOR PRODUCING NEAR-INFRARED CURED PRODUCT

(71) Applicant: SUMITOMO METAL MINING CO., LTD., Tokyo (JP)

(72) Inventors: Hirofumi Tsunematsu, Chiba (JP); Kenji Adachi, Chiba (JP); Masao Wakabayashi, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 18/292,561

(22) PCT Filed: Jul. 28, 2022

(86) PCT No.: PCT/JP2022/029192

§ 371 (c)(1),
(2) Date: Jan. 26, 2024

(87) PCT Pub. No.: WO2023/008536

PCT Pub. Date: Feb. 2, 2023

(65) Prior Publication Data

US 2025/0084264 A1 Mar. 13, 2025

(30) Foreign Application Priority Data

Jul. 29, 2021 (JP) ................................ 2021-124045

(51) Int. Cl.
*C09D 11/101* (2014.01)
*B05D 3/06* (2006.01)
(Continued)

(52) U.S. Cl.
CPC .............. *C09D 11/101* (2013.01); *B05D 3/06* (2013.01); *C01G 41/02* (2013.01); *C09D 11/037* (2013.01);
(Continued)

(58) Field of Classification Search
None
See application file for complete search history.

(56) References Cited

U.S. PATENT DOCUMENTS

2009/0280302 A1 11/2009 Fukumoto et al.
2020/0224043 A1 7/2020 Okada et al.

FOREIGN PATENT DOCUMENTS

| | | |
|---|---|---|
| JP | H07-100433 | 4/1995 |
| JP | 2000-037943 | 2/2000 |
| JP | 2001-146559 | 5/2001 |
| JP | 2004-018716 | 1/2004 |
| JP | 2008-214576 | 9/2008 |

(Continued)

OTHER PUBLICATIONS

Nakakura et al. Cationic Defect Engineering for Controlling the Infrared Absorption of Hexagonal Cesium Tungsten Bronze Nanoparticles. Inorg. Chem. 2019, 58, 14, 9101-9107. (Year: 2019).*

(Continued)

*Primary Examiner* — Sanza L. McClendon
(74) *Attorney, Agent, or Firm* — IPUSA, PLLC

(57) ABSTRACT

Provided is a near-infrared curable ink composition including: a thermosetting resin or a thermoplastic resin; and near-infrared absorbing particles. The near-infrared absorbing particles contain a cesium tungsten oxide having an orthorhombic or hexagonal crystal structure and represented by a general formula: $Cs_xW_{1-y}O_{3-z}$ (where $0.2 \le x \le 0.4$, $0 < y \le 0.4$, $0 < z \le 0.46$).

13 Claims, 10 Drawing Sheets

(51) Int. Cl.
*C01G 41/02* (2006.01)
*C09D 11/037* (2014.01)

(52) U.S. Cl.
CPC ...... *B05D 2601/20* (2013.01); *C01P 2002/60* (2013.01); *C01P 2002/77* (2013.01); *C01P 2004/04* (2013.01); *C01P 2004/62* (2013.01); *C01P 2004/64* (2013.01)

(56) References Cited

FOREIGN PATENT DOCUMENTS

| | | | | |
|---|---|---|---|---|
| JP | 2009-057548 | | 3/2009 | |
| JP | 2012-140516 | | 7/2012 | |
| JP | 2015-131928 | | 7/2015 | |
| WO | 2017/047736 | | 3/2017 | |
| WO | WO-2017047736 | A1 * | 3/2017 | ............. B29C 67/00 |
| WO | WO-2018235829 | A1 * | 12/2018 | ........... B29C 64/124 |
| WO | 2019/054478 | | 3/2019 | |
| WO | WO-2019054478 | A1 * | 3/2019 | ........... B29C 64/106 |

OTHER PUBLICATIONS

K. Adachi and T. Asahi, "Activation of plasmons and polarons in solar control cesium tungsten bronze and reduced tungsten oxide nanoparticles," Journal of Material Research, vol. 27, 965-970 (Mar. 28, 2012).

S. Yoshio and K. Adachi, "Polarons in reduced cesium tungsten bronzes studied using the DFT + U method," Materials Research Express, vol. 6, 026548, 1-14 (2019).

K. Machida, M. Okada, and K. Adachi, "Excitations of free and localized electrons at nearby energies in reduced cesium tungsten bronze nanocrystals," Journal of Applied Physics, vol. 125, 103103 (Mar. 12, 2019).

S. F. Solodovnikov, N.V. Ivannikova, Z.A. Solodovnikova, E.S. Zolotova, "Synthesis and X-ray diffraction study of potassium, rubidium, and cesium polytungstates with defect pyrochlore and hexagonal tungsten bronze structures," Inorganic Materials, vol. 34, No. 8, 845-853 (1998).

M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, vol. 102, 5386-5400 (2019).

S. Yoshio, M. Okada, K. Adachi, "Destabilization of Pseudo Jahn-Teller Distortion in Cesium-doped hexagonal tungsten bronzes", J. Appl. Phys., vol. 124, 063109-1-8 (Aug. 14, 2018).

International Search Report mailed on Sep. 27, 2022 with respect to PCT/JP2022/029192.

Satoshi Yoshio, Masao Wakabayashi, and Kenji Adachi, "Cesium polytungstates with blue-tint-tunable near-infrared adsorption", RSC Advances , Mar. 11, 2020, 10, 10491-10501.

* cited by examiner

FIG.3A
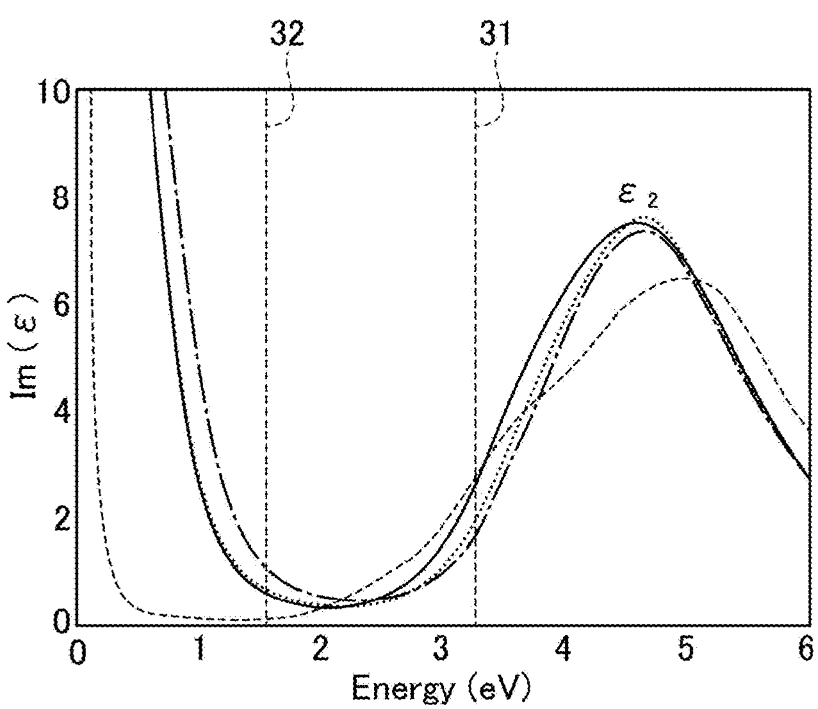
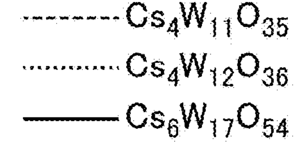
FIG.3B
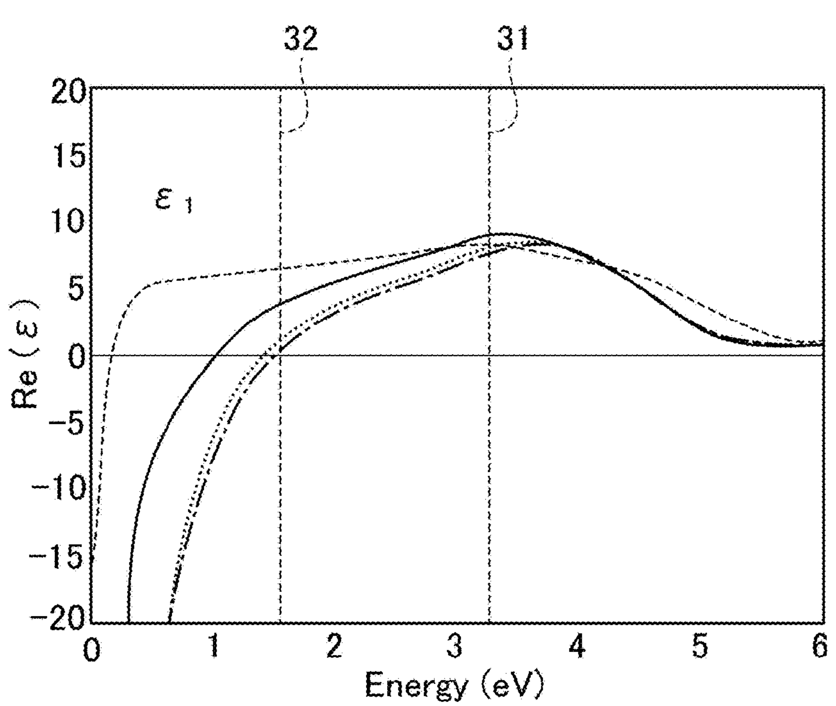
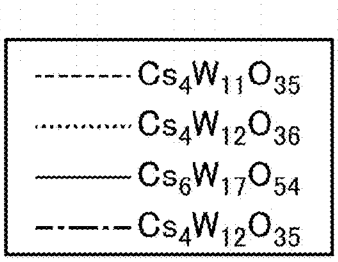

NEAR-INFRARED CURABLE INK COMPOSITION, NEAR-INFRARED CURED FILM, METHOD FOR PRODUCING NEAR-INFRARED CURED PRODUCT

TECHNICAL FIELD

The present invention relates to a near-infrared curable ink composition, a near-infrared cured film, and a method for producing a near-infrared cured product.

BACKGROUND OF THE INVENTION

In recent years, ultraviolet curable paints that are cured by using ultraviolet rays have come to be widely known as environmentally friendly paints as described in, for example, Patent Document 1 to Patent Document 6, because they can be printed without being heated.

However, when ultraviolet curable inks and paints are compositions that undergo radical polymerization in response to ultraviolet irradiation, polymerizing (curing) them is inhibited in the presence of oxygen. On the other hand, compositions that undergo cationic polymerization in response to ultraviolet irradiation have a problem that a strong acid is produced during their polymerization.

Moreover, in order to increase light resistance of a printed surface or a coated surface, which may be, for example, films obtained by applying ultraviolet curable inks and paints, ultraviolet absorbents are typically added to the ultraviolet curable inks and paints, which are the raw materials of the printed surface or the coated surface. However, there is a problem that ultraviolet curable inks and paints to which ultraviolet absorbents are added are inhibited from being cured by ultraviolet irradiation.

To solve these problems, Patent Document 7 and Patent Document 8 propose near-infrared curable compositions that cure by irradiation with near-infrared rays, not ultraviolet rays.

The applicant of the present application has disclosed near-infrared curable ink compositions containing a complex tungsten oxide in Patent Document 9 and Patent Document 10.

RELATED-ART DOCUMENT

Patent Document

- Patent Document 1: Japanese Patent Application Laid-Open No. 7-100433
- Patent Document 2: Japanese Patent Application Laid-Open No. 2001-146559
- Patent Document 3: Japanese Patent Application Laid-Open No. 2009-057548
- Patent Document 4: Japanese Patent Application Laid-Open No. 2012-140516
- Patent Document 5: Japanese Patent Application Laid-Open No. 2000-037943
- Patent Document 6: Japanese Patent Application Laid-Open No. 2004-18716
- Patent Document 7: Japanese Patent Application Laid-Open No. 2008-214576
- Patent Document 8: Japanese Patent Application Laid-Open No. 2015-131928
- Patent Document 9: International Publication No. WO 2017/047736 Patent Document 10: International Publication No. WO 2019/054478

Non-Patent Document

- Non-Patent Document 1: K. Adachi and T. Asahi, "Activation of plasmons and polarons in solar control cesium tungsten bronze and reduced tungsten oxide nanoparticles," Journal of Material Research, Vol. 27, 965-970 (2012)
- Non-Patent Document 2: S. Yoshio and K. Adachi, "Polarons in reduced cesium tungsten bronzes studied using the DFT+U method," Materials Research Express, Vol. 6, 026548 (2019)
- Non-Patent Document 3: K. Machida, M. Okada, and K. Adachi, "Excitations of free and localized electrons at nearby energies in reduced cesium tungsten bronze nanocrystals," Journal of Applied Physics, Vol. 125, 103103 (2019)
- Non-Patent Document 4: S. F. Solodovnikov, N. V. Ivannikova, Z. A. Solodovnikova, E. S. Zolotova, "Synthesis and X-ray diffraction study of potassium, rubidium, and cesium polytungstates with defect pyrochlore and hexagonal tungsten bronze structures," Inorganic Materials, Vol. 34, 845-853 (1998)
- Non-Patent Document 5: M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, Vol. 102, 5386-5400 (2019)
- Non-Patent Document 6: S. Yoshio, M. Okada, K. Adachi, "Destabilization of Pseudo Jahn-Teller Distortion in Cesium-doped Hexagonal Tungsten Bronzes", J. Appl. Phys., vol. 124, 063109-1-8 (2018)

SUMMARY OF THE INVENTION

Problems to be Solved by the Invention

However, according to the present inventors' studies, the near-infrared curable compositions described in Patent Document 7 and Patent Document 8 indicated above both have a problem that their near-infrared absorption property is not sufficient.

As compared with this, the complex tungsten oxide particles contained in the near-infrared curable ink compositions disclosed in Patent Document 9 and Patent Document 10 are materials that have a low transmittance and a high absorptivity with respect to the light in the near-infrared region in spite of having a high transmittance and a low absorptivity with respect to the visible light. Hence, near-infrared curable ink compositions containing the complex tungsten oxide particles also have an excellent near-infrared absorption property.

However, because the complex tungsten oxide particles preferentially absorb long-wavelength light, i.e., red light included in the visible light, they are colored in blue, and the degree of blueness is strengthened as the adding amount of the particles is increased. Hence, for example, cured films obtained from the complex tungsten oxide particles being contained as a near-infrared absorbing component are colored in blue, and it is difficult to color such films in yellow, which is the complementary color of blue, or in pale colors other than blue, by adding other pigments.

Hence, according to an aspect of the present invention, it is an object to provide a near-infrared curable ink composition that contains near-infrared absorbing particles containing a complex tungsten oxide, and that can have a more neutral color tone when cured.

Means for Solving the Problems

According to an aspect of the present invention, a near-infrared curable ink composition, including:

a thermosetting resin or a thermoplastic resin; and near-infrared absorbing particles is provided.

The near-infrared absorbing particles contain a cesium tungsten oxide having an orthorhombic or hexagonal crystal structure and represented by a general formula: $Cs_xW_{1-y}O_{3-z}$ (where $0.2 \leq x \leq 0.4$, $0 < y \leq 0.4$, $0 < z \leq 0.46$).

Effects of the Invention

According to an aspect of the present invention, it is possible to provide a near-infrared curable ink composition that contains near-infrared absorbing particles containing a complex tungsten oxide, and that can have a more neutral color tone when cured.

BRIEF DESCRIPTION OF THE DRAWINGS

FIG. 3A illustrates a dielectric function of a cesium tungsten oxide.

FIG. 3B illustrates a dielectric function of a cesium tungsten oxide.

DETAILED DESCRIPTION OF THE INVENTION

Figure 1A:
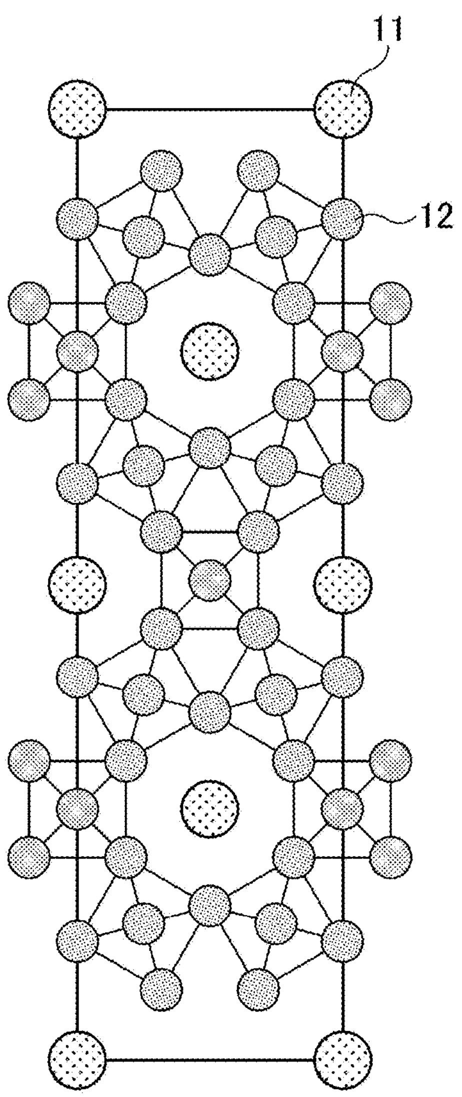
FIG. 1A is a drawing of a crystal structure of a cesium tungsten oxide.
Figure 1A:
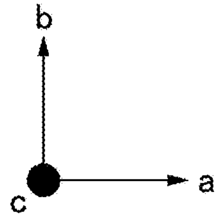

A mode for carrying out the present invention will be described below with reference to the drawings. The present invention is not limited to the embodiment described below, and various modifications and replacements are applicable to the embodiment described below without departing from the scope of the present invention.

[Near-Infrared Curable Ink Composition]

Regarding a near-infrared curable ink composition according to the present embodiment, [1] near-infrared absorbing particles and a method for producing the near-infrared absorbing particles, [2] a near-infrared absorbing particle dispersion liquid, [3] a near-infrared curable ink composition, and [4] a method for producing the near-infrared curable ink composition will be described in this order.

[1] Near-Infrared Absorbing Particles and a Method for Producing Near-Infrared Absorbing Particles (Near-Infrared Absorbing Particles)

Colors that are transmitted through cesium-added hexagonal tungsten bronze particles traditionally used as near-infrared absorbing particles are defined by the imaginary part ($\varepsilon_2$) of the dielectric function of the cesium-added hexagonal tungsten bronze particles (an experimentally found 82 is indicated in Non-Patent Document 1), and by their band structure (Non-Patent Document 2).

In the visible light energy region (from 1.6 eV through 3.3 eV), cesium-added hexagonal tungsten bronze (hereinafter, abbreviated as Cs-HTB) has a sufficiently wide bandgap. Moreover, because, for example, d-d inter-orbital electron transition is forbidden in tungsten under the Fermi's golden rule, chances of electron transition are low, and $\varepsilon_2$ assumes a small value. Since $\varepsilon_2$ represents electrons' absorption of photons, a material having a small $\varepsilon_2$ at the visible wavelengths has visible light transmittance. However, wavelengths around the blue wavelengths, which are the shortest wavelengths in the visible light region, may be absorbed due to interband transition, and wavelengths around the red wavelengths, which are the longest wavelengths, may be absorbed due to Localized Surface Plasmon Resonance (LSPR) and polaronic electron transition (Non-Patent Document 3). Hence, light transmittance may be restricted at both of these wavelength sides.

Cs-HTB has a high blue transmittance because interband transition across its sufficiently wide bandgap mentioned above needs energy equal to or higher than the energy of the blue wavelength light. On the other hand, at the red wavelength side, Cs-HTB possessing abundant conduction electrons strengthens LSPR absorption and polaronic absorption, and this also brings the absorption wavelength closer to the red wavelength side, resulting in a low transmittance. Hence, the color that is transmitted through, for example, a Cs-HTB particle dispersed film appears blue. That is, in order to neutralize the blue-based transmission color of Cs-HTB, it is rational to strengthen blue absorption and strengthen red transmission. To this end, it is desirable to shift the position of interband transition absorption to a lower energy, and to weaken LSPR absorption and polaronic absorption and shift them to a lower energy side.

To weaken LSPR absorption and polaronic absorption, it is effective to decrease the amount of free electrons and bound electrons contained in the material.

Increase in blue absorption mentioned above is realized based on a material having a different energy band structure, in which, for example, the bandgap is at a low energy. It is possible to control red transmission by adjusting the amount of cesium ions ($Cs^+$) and oxygen vacancies (Vo), which are the sources from which free electrons and bound electrons are produced.

Based on the above observation, the inventors of the present invention have conducted various studies into cesium tungsten oxides, which are oxides containing cesium (Cs) and tungsten (W). As a result, it has been found that near-infrared absorbing particles containing a cesium tungsten oxide obtained by reducing a powder of a crystal of a cesium tungsten oxide precursor $nCs_2O{\cdot}mWO_3$ (where n and m are integers, and $3.6 \le m/n \le 9.0$) containing Cs and W can produce a less bluish and more neutralized color tone in the dispersed products thereof, such as a near-infrared absorbing particle dispersed body such as a transmission film, and a near-infrared absorbing particle dispersion liquid. It has also been found that a near-infrared curable ink composition containing the near-infrared absorbing particles and a cured product thereof can also have a more neutral color tone.

The neutralized color tone of the near-infrared absorbing particles is considered to have been obtained by using a compound having a low blue transmittance because of a narrower bandgap than that of hexagonal Cs-HTB as a starting material, reducing the compound to gradually increase Vo, and gradually increasing LSPR absorption and polaronic absorption to tolerable extents to adjust the red transmittance to an appropriate level.

The Cs-containing cesium tungsten oxide precursor $nCs_2O{\cdot}mWO_3$, in which the charges of the electropositive elements Cs and W are neutralized by O, is a non-electrical conductor. Compounds such as $Cs_2W_7O_{22}$, $Cs_6W_{20}O_{63}$, $Cs_2W_6O_{19}$, $Cs_4W_{11}O_{35}$, $Cs_6W_{11}O_{36}$, and $Cs_2W_3O_{10}$, which are lined up on the line of $WO_3$—$Cs_2O$, are non-electrical conductors, because they have balanced valences and have the Fermi energy $E_F$ between the valance band and the conduction band. When the Cs/W ratio (mole ratio) is 0.2 or greater, because of Cs having a large ionic radius being introduced, the basic skeleton formed by W—O octahedrons has a large-hexagonal gap-including hexagonally symmetrical structure, or has a crystal structure resulting from the atomic array of a large-hexagonal gap-including hexagonal crystal or cubic crystal (pyrochlore structure) being decreased in symmetry to an orthorhombic or monoclinic crystal due to occurrence of a plane defect including a W loss (tungsten loss).

For example, in a case of $2Cs_2O{\cdot}11WO_3$, a model disclosed in Solodovnikov 1998 (Non-Patent Document 4) is, on the whole, an orthorhombic crystal due to W and O-lost planes being inserted, at an orthorhombic crystal unit cell's b/8 pitch, into hexagonal crystal (110) planes (=orthorhombic crystal (010) planes) of the hexagonal array of W—O octahedrons like that of a hexagonal tungsten bronze. These cesium tungsten oxide precursors $nCs_2O{\cdot}mWO_3$ (where n and m are integers, $3.6 \le m/n \le 9.0$) have a bandgap narrower than that of Cs-HTB and hence have a lower blue transmittance. However, it has been found that when they are reduced by heating, they gradually change to the tungsten bronze's hexagonal crystal structure on the whole, and their band structure changes along with this process to broaden the bandgap, which weakens blue absorption and strengthens blue transmission. Moreover, along with the progress of the reduction here, electrons are gradually injected into the conduction band, to change the material to a conductor, and the bandgap gradually broadens under the Burstein-Moss effect, to strengthen blue transmission even more.

When an orthorhombic crystal changes to a hexagonal crystal by being reduced by heating, W-loss-including plane defects in the orthorhombic crystal are gradually eliminated, to form a hexagonal crystal skeleton of W—O octahedrons. The W-loss-including plane defects exist on $(010)_{ORTH}$ planes, which are succeeded by hexagonal crystal prismatic planes $\{100\}_{HEX}$, i.e., by $[(100)_{HEX}, (010)_{HEX}, (110)_{HEX}]$. Hence, along with reduction by heating, a hexagonal crystal including defects on the $\{100\}_{HEX}$ planes is formed. The hexagonal crystal here, which includes defects on the $\{100\}_{HEX}$ planes, does not have a perfect hexagonal symmetry and is in a state that can be referred to as a pseudohexagonal crystal. Hence, along with reduction by heating, the crystal structure changes from an orthorhombic crystal to a pseudohexagonal crystal, and to a hexagonal crystal. Here, it is considered that the W-loss-including plane defects on the $(010)_{ORTH}$ planes contained in the orthorhombic crystal are succeeded as plane defects on the $\{100\}_{HEX}$ planes and gradually decreased, and are ultimately eliminated.

The electron structure also changes along with the change of the crystal structure in response to reduction by heating. Elimination of the W loss brings about injection of abundant electrons into the material. In an orthorhombic crystal, the outer-shell electron of Cs is consumed for neutralization of O and keeps the orthorhombic crystal charge-neutral on the whole. However, as the W loss decreases and changes the structure to a pseudohexagonal crystal, six outer-shell electrons per W atom are consumed for neutralization of O, to make the Cs's outer-shell electron enter the W-5d orbit at a lower level of the conduction band and become a free electron. This free electron brings about near-infrared absorption under the LSPR absorption effect. On the other hand, reduction by heating also works to generate Vo. Vo generation occurs at random sites. A generated Vo makes the W atoms on both sides charge-excessive, and generates localized electrons that are bound to $W^{5+}$ (Non-Patent Document 2). The localized electrons transit to vacant positions at upper levels of the conduction band and bring about polaronic absorption. Some of the localized electrons are excited into the free electron orbit and bring about LSPR absorption (Non-Patent Document 3). The free electrons and the bound electrons both have absorption peak wavelengths in the near-infrared range, and the skirt of their absorption spectrum covers red wavelengths, to decrease red transmittance. As the amount of free electrons and bound electrons increases, i.e., as the degree of reduction increases, the wavelengths absorbed under LSPR and polaronic effects shift to the longer wavelength side and the amount of absorption also increases, resulting in decrease in the red transmittance.

Hence, it is possible to neutralize blue-based transmission color, by reducing the powder of the crystal of the cesium tungsten oxide precursor $nCs_2O{\cdot}mWO_3$ (where n and m are integers, $3.6 \le m/n \le 9.0$) while adjusting the degree of reduction.

It is possible to produce the near-infrared absorbing particles according to the present embodiment described above, by heating the powder of the crystal of the cesium tungsten oxide precursor $nCs_2O{\cdot}mWO_3$ containing Cs and W in a reductive atmosphere at 650° C. or higher and 950° C. or lower. In the above-given formula of the cesium tungsten oxide, n and m are integers, and it is preferable that $3.6 \le m/n \le 9.0$ is satisfied.

That is, as the near-infrared absorbing particles, it is possible to use particles obtained by reducing the cesium and tungsten-containing cesium tungsten oxide precursor $nCs_2O{\cdot}mWO_3$ (where n and m are integers, $3.6 \le m/n \le 9.0$) by heating in a reductive gas atmosphere at 650° C. or higher and 950° C. or lower.

In order for the whole or a part of the material to become hexagonal tungsten bronze through heating and reduction, the value m/n needs to be in the range of $3.6 \le m/n \le 9.0$ as described above. When the value is less than 3.6, heating and reduction results in a cubic pyrochlore phase, which is strongly colored and has no near-infrared absorption. When the value is greater than 9.0, heating and reduction results in phase separation into a hexagonal tungsten bronze and tungsten trioxide, with a considerable decrease in the near-infrared absorbing effect. It is preferable that the cesium tungsten oxide precursor is $Cs_4W_{11}O_{35}$ in which m/n=5.5. That is, as the near-infrared absorbing particles, it is more preferable to use particles that are obtained by heating and reducing a cesium tungsten oxide precursor containing a $Cs_4W_{11}O_{35}$ phase as a main phase in a reductive gas atmosphere at 650° C. or higher and 950° C. or lower. When near-infrared absorbing particles obtained by reducing $Cs_4W_{11}O_{35}$ at a high temperature are dispersed, the near-infrared absorbing particles can achieve a high near-infrared absorbing effect while having a blue-saved transmission color. Here, the main phase means a phase that is contained the most in the cesium tungsten oxide precursor on a mass ratio basis.

The heating temperature when reducing the cesium tungsten oxide is preferably 650° C. or higher and 950° C. or lower as described above. At 650° C. or higher, it is possible to sufficiently develop a structural change from an orthorhombic crystal to a hexagonal crystal, and to increase the near-infrared absorbing effect. At 950° C. or lower, it is possible to maintain the speed of crystal structural change at a suitable level, which enables easy control to a suitable crystal state and a suitable electron state. It is not preferable to increase the heating temperature to higher than 950° C. and excessively promote reduction, because the W metal and a suboxide such as $WO_2$ may be produced.

The near-infrared absorbing particles according to the present embodiment may contain cesium tungsten oxide having an orthorhombic or hexagonal crystal structure and represented by a general formula: $Cs_xW_{1-y}O_{3-z}$ ($0.2 \leq x \leq 0.4$, $0 < y \leq 0.4$, $0 < z \leq 0.46$). The near-infrared absorbing particles may also contain a cesium tungsten oxide having an orthorhombic crystal structure and a cesium tungsten oxide having a hexagonal crystal structure at the same time.

When the cesium tungsten oxide contained in the near-infrared absorbing particles satisfies the general formula given above, the degrees of W loss and oxygen vacancies $V_o$ are in suitable ranges. Hence, their dispersed form, which may be, for example, a near-infrared curable ink composition, can restrict the solar radiation transmittance, and a cured product thereof can transmit a color having a more neutral color tone.

The near-infrared absorbing particles may be made of a cesium tungsten oxide, which is the complex tungsten oxide described above. However, also in this case, this does not exclude the near-infrared absorbing particles containing unavoidable impurities that may mix due to a production process.

A hitherto-known tungsten bronze for near-infrared absorption has a hexagonal crystal structure. On the other hand, the complex tungsten oxide contained in the near-infrared absorbing particles according to the present embodiment may have an orthorhombic or hexagonal crystal structure. The hexagonal crystal here also encompasses a pseudohexagonal crystal.

It is preferable that the cesium tungsten oxide, which is the complex tungsten oxide and is contained in the near-infrared absorbing particles, contains a line-shaped or plane-shaped defect on one or more planes selected from orthorhombic (010) planes, hexagonal {100} prismatic planes, and hexagonal (001) basal planes. The defect includes a stacking fault due to a mutual displacement between planes, and a disorder in the in-plane arrangement or atom positions of a Cs atom and a W atom. Hence, electron beam diffraction spots often appear with streaks. The hexagonal {100} prismatic planes represent a (100) plane, a (010) plane, and a (110) plane. Such a defect, i.e., a lattice defect of the complex tungsten oxide entails at least W loss, specifically, loss of some W. The W loss induces lack of electrons in the crystal. This is one fundamental cause enabling the working for neutralization of the blue color tone, as described above.

The cesium tungsten oxide contains a defect, and such a defect may include tungsten loss as described above.

Moreover, some O of an orthorhombic or hexagonal crystal-forming W—O octahedron, i.e., a $WO_6$ octahedron, which is the basic structure of the cesium tungsten oxide, may also be lost. Such loss may be random loss. Such oxygen vacancies $V_o$ in the octahedron may be introduced randomly as described above, and it is known that a known hexagonal tungsten bronze $Cs_{0.32}WO_{3-y}$ contains oxygen vacancies that reach y=0.46 or a maximum of 15% of all O lattice positions (Non-Patent Document 5). The cesium tungsten oxide contained in the near-infrared absorbing particles according to the present embodiment may contain $V_O$ up to a maximum of z=0.46 in the general formula $Cs_xW_{1-y}O_{3-z}$ representing the cesium tungsten oxide. That is, z may be 0.46 or less.

The lattice constants of the cesium tungsten oxide match the amount of defects in the crystal lattice, or the composition and crystallinity. The a-axis value is observed to have variation with respect to these variables, whereas the c-axis value match the amount of lattice defects or optical properties relatively well. Hence, it is preferable that the cesium tungsten oxide contained in the near-infrared absorbing particles according to the present embodiment has a c-axis length of 7.560 Å or greater and 7.750 Å or less, as a value translated in terms of a hexagonal crystal. When the c-axis length of the cesium tungsten oxide translated in terms of a hexagonal crystal is in the range specified above, it is possible to sufficiently increase the near-infrared absorbing effect, and to increase the visible light transmittance in particular. When the cesium tungsten oxide is a hexagonal crystal, translation is unnecessary, and the c-axis length of the hexagonal crystal is the c-axis length translated in terms of a hexagonal crystal described above.

The cesium tungsten oxide contained in the near-infrared absorbing particles according to the present embodiment is often identified as a mixed phase of an orthorhombic crystal and a hexagonal crystal, when a diffraction pattern of a sample is measured by X-ray powder diffractometry. For example, when the $Cs_4W_{11}O_{35}$ raw material is reduced, the resulting product is identified as a mixed phase of orthorhombic $Cs_4W_{11}O_{35}$ and hexagonal $Cs_{0.32}WO_3$. In this case, the lattice constants of each phase are found by, for example, a Rietveld analysis, and can be translated to values of a hexagonal crystal. Since an orthorhombic crystal is a hexagonal crystal containing a lattice defect plane as described above, the lattice constants of the orthorhombic crystal can be translated to lattice constants of a hexagonal crystal based on a suitable lattice correspondence model. When the correspondence defining lattice changes between an orthorhombic crystal and a hexagonal crystal is assumed to be the Solodovnikov 1998 model (Non-Patent Document 4), relationships $4a_{orth}^2+b_{orth}^2=64a_{hex}^2=64b_{hex}^2$ and $c_{orth}=C_{hex}$ are extracted from geometric relationships with respect to the model. Using these formulae, all lattice constants translated in terms of a hexagonal crystal can be calculated. In the formulae above, $a_{orth}$, $b_{orth}$, and $c_{orth}$ represent the lengths of the a-axis, the b-axis, and the c-axis of an orthorhombic crystal, and $a_{hex}$, $b_{hex}$, and $c_{hex}$ represent the lengths of the a-axis, the b-axis, and the c-axis of a hexagonal crystal.

In the cesium tungsten oxide contained in the near-infrared absorbing particles according to the present embodiment, some Cs may be replaced with an additive element. In this case, it is preferable that the additive element is one or more selected from Na, Tl, In, Li, Be, Mg, Ca, Sr, Ba, Al, and Ga.

The additive element has an electron donating property, and assists electron donation to the conduction band of the W—O octahedral skeleton while being in the Cs site.

The average particle diameter of the near-infrared absorbing particles according to the present embodiment is not particularly limited, yet is preferably 0.1 nm or greater and 200 nm or less. This is because the near-infrared absorbing particles having an average particle diameter of 200 nm or less expresses localized surface plasmon resonance more remarkably, and can hence have an increased near-infrared absorbing property in particular, i.e., a restricted solar radiation transmittance in particular. Moreover, the average particle diameter of 0.1 nm or greater is preferable because it is easy to industrially produce the near-infrared absorbing particles having such an average particle diameter. The particle diameter is closely related to the color of, for example, a near-infrared absorbing particle dispersed body, which is a dispersed transmission film in which the near-infrared absorbing particles are dispersed. In a particle diameter range in which Mie scattering is dominant, short wavelengths in the visible light range are less scattered as the particle diameter is smaller. Hence, increasing the particle diameter works to inhibit the blue color tone in particular. However, a particle diameter greater than 100 nm makes a film haze due to light scattering unignorably high. A particle diameter greater than 200 nm may inhibit occurrence of surface plasmon and make LSPR absorption excessively low, in addition to increasing a film haze.

Here, the average particle diameter of the near-infrared absorbing particles can be known from the average of particle diameters of a plurality of near-infrared absorbing particles measured from a transmission electron microscopic image, and or a dispersed particle diameter measured by a particle diameter measuring instrument that is based on a dynamic light scattering method of a dispersion liquid.

In an application in which transparency in the visible light range is particularly important, for example, in a case where it is particularly demanded to inhibit effects on the color tone of a near-infrared curable ink composition or a cured product thereof, it is desirable to take greater care to decrease scattering by the near-infrared absorbing particles. In a case where it is important to decrease scattering, the average particle diameter of the near-infrared absorbing particles is particularly preferably 30 nm or less.

The near-infrared absorbing particles may be subjected to surface treatment for the purpose of, for example, surface protection, durability improvement, antioxidation, and water resistance improvement. The specific content of the surface treatment is not particularly limited. For example, the surface of the near-infrared absorbing particles according to the present embodiment may be coated with a compound containing one or more kinds of atoms selected from Si, Ti, Zr, Al, and Zn. Examples of the compound containing one or more kinds of atoms (elements) selected from Si, Ti, Zr, Al, and Zn include one or more selected from oxides, nitrides, and carbides.

Here, the band structures of the cesium tungsten oxide and the cesium tungsten oxide precursor will be described.

As described above, it has been shown that when $nCs_2O{\cdot}mWO_3$ (where n and m are integers, $3.6 \leq m/n \leq 9.0$) is reduced at a high temperature, a solar radiation shielding material that transmits a more neutral color can be obtained. Through a change to a hexagonal crystal including elimination of W loss, and generation of $V_O$, reduction at a high temperature induces injection of electrons into the conduction band, and injected electrons are considered to serve as the source of expression of near-infrared absorption. This electron structure change will be corroborated based on the first-principles calculation.

Figure 1B:
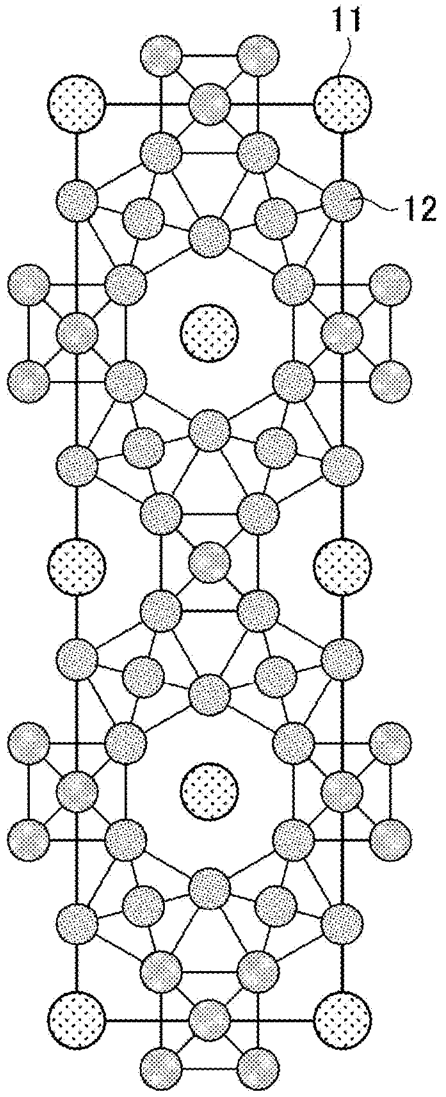
FIG. 1B is a drawing of a crystal structure of a cesium tungsten oxide.
Figure 1B:
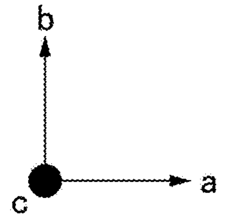

FIG. 1A illustrates a crystal structure of $Cs_4W_{11}O_{35}$. FIG. 1B illustrates a crystal structure of $Cs_4W_{12}O_{36}$, Which is $Cs_{0.33}WO_3$. FIG. 1A and FIG. 1B illustrate cesium 11 and oxygen 12. Atoms of the same type are denoted by the same hatching. Tungsten is not illustrated in FIG. 1A and FIG. 1B, since tungsten is placed inside the octahedrons formed by the oxygen 12. FIG. 1B illustrates $Cs_{0.33}WO_3$ as a structure in which orthorhombic crystal axes are set in order to enable comparison with $Cs_4W_{11}O_{35}$ of FIG. 1A.

The $Cs_4W_{11}O_{35}$ structure of FIG. 1A is a version of the $Cs_4W_{12}O_{36}$ structure of FIG. 1B in which W and O are regularly lost.

Figure 2A:
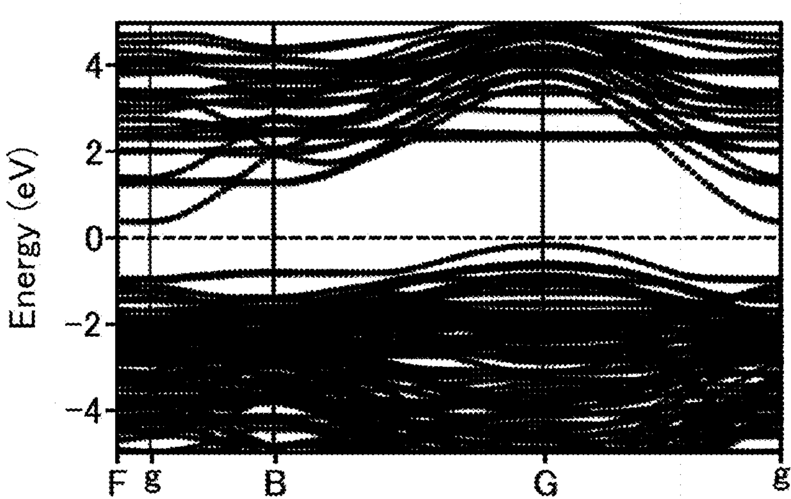
FIG. 2A illustrates an energy band structure of a cesium tungsten oxide.
Figure 2B:
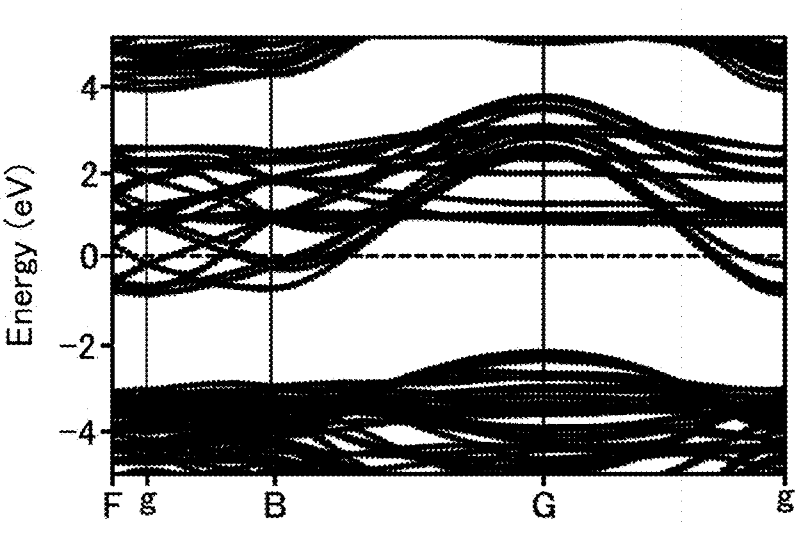
FIG. 2B illustrates an energy band structure of a cesium tungsten oxide.
Figure 2C:
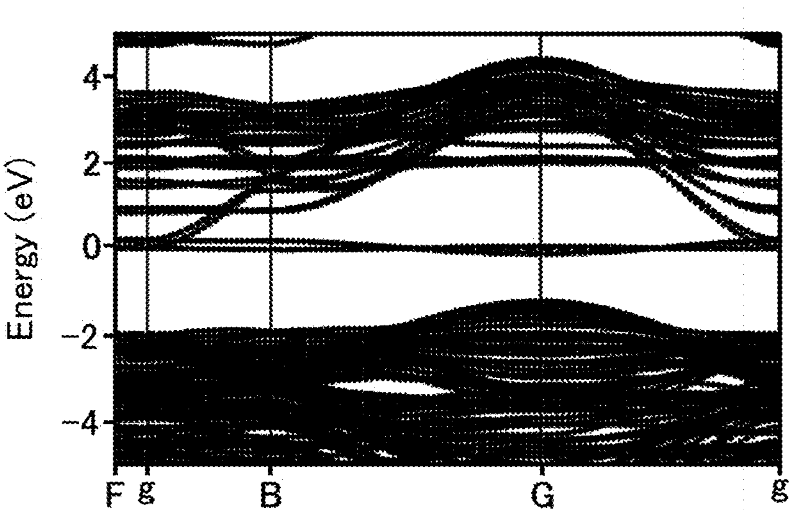
FIG. 2C illustrates an energy band structure of a cesium tungsten oxide.

FIG. 2A and FIG. 2B illustrate the band structures of the cesium tungsten oxides having the crystal structures of FIG. 1A and FIG. 1B, respectively. FIG. 2C illustrates a band structure of $Cs_4W_{11}O_{36}$, which lacks one W of $Cs_4W_{12}O_{36}$ Of FIG. 1B, and FIG. 2D illustrates a band structure of $Cs_6W_{17}O_{54}$, which lacks one W of $Cs_4W_{12}O_{36}$ Of FIG. 1B when assumed in a cell that is expanded in the b-axis direction by 1.5 times as that of $Cs_4W_{12}O_{36}$ of FIG. 1B.

The band structure of $Cs_4W_{11}O_{35}$ and the band structure of $Cs_4W_{12}O_{36}$ illustrated in FIG. 2A and FIG. 2B are similar to each other, but the position of the Fermi energy ($E_F$) is in the bandgap in the former whereas the position of the Fermi energy ($E_F$) is at a lower level of the conduction band in the latter. Hence, the $Cs_4W_{11}O_{35}$ is an insulator, but $Cs_4W_{12}O_{36}$ is a conductor. $Cs_4W_{11}O_{35}$ lacks in one W and one O in its unit cell, compared with $Cs_4W_{12}O_{36}$. $Cs_4W_{12}O_{36}$, full of W and O, forms the network of a hexagonal crystal $WO_3$, and is construed as serving as a conductor by the Cs's electron being injected into the W-5d orbit (Non-Patent Document 6).

$Cs_4W_{11}O_{36}$ Of FIG. 2C is a structure that lacks one W of $Cs_4W_{12}O_{36}$ of FIG. 2B.

Figure 2D:
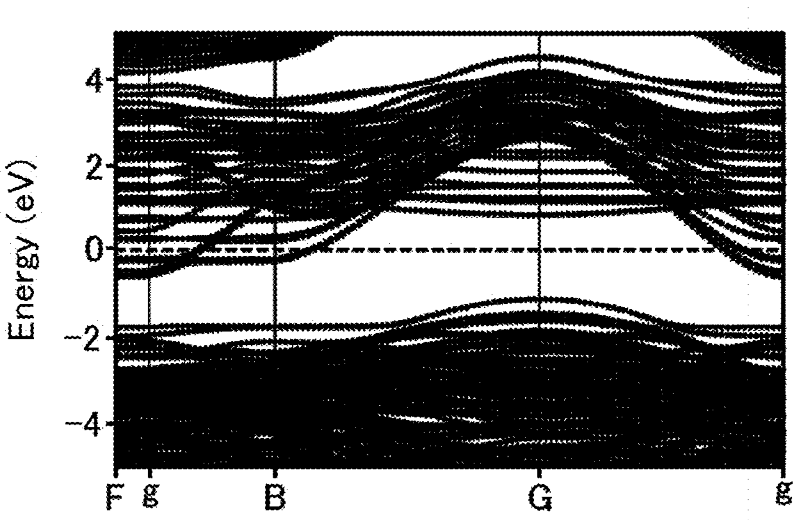
FIG. 2D illustrates an energy band structure of a cesium tungsten oxide.

$Cs_4W_{17}O_{54}$ of FIG. 2D, i.e., $3Cs_2O{\cdot}17WO_3$ is a structure that lacks one W of $Cs_4W_{12}O_{36}$ of FIG. 2B, i.e., $Cs_6W_{18}O_{54}$, while maintaining charge neutrality.

The amount of W loss descends in the order of FIG. 2A, FIG. 2D, and FIG. 2B, while E, ascends to the bottom side of the conduction band in this order. This corroborates increase in the near-infrared absorption along with increase in conduction electrons through injection of W's electrons into the W-5d orbit.

A detailed calculation example in a case of O-lost $Cs_4W_{12}O_{36}$ has already been reported, and it has become known that free electrons and localized electrons significantly increase along with introduction of a localized orbit into the bottom of the conduction band (Non-Patent Document 2).

An experimentally obtained pseudohexagonal crystal (i.e., an intermediate structure that is in the middle of phase transfer between an orthorhombic crystal and a hexagonal crystal) is inferred to have an electron state in which the factors described above are mixed. That is, along with reduction, there occur: a change to a hexagonal crystal including elimination of W loss; and $V_O$ generation, to induce gradual injection of electrons into the conduction band and raise the Fermi energy $E_F$ from the bandgap to a lower level of the conduction band.

The results of calculating a dielectric function including a Drude term based on, for example, these band structures are indicated in FIG. 3A and FIG. 3B. When focus is put on the position $\varepsilon_1=0$ of the dielectric function $\varepsilon_1$ indicated in FIG. 3B, it can be seen that the shielded plasma frequency ($\Omega_{SP}$) ascends in the order of $Cs_4W_{11}O_{35}$, $Cs_6W_{17}O_{54}$, $Cs_4W_{12}O_{36}$, and $Cs_4W_{12}O_{35}$. It is predicted that the near-infrared absorption ascends in this order, and this tendency is the same as an observation result.

From the dielectric function 82 plot indicated in FIG. 3A, it can be seen that cesium tungsten oxides in general have a small 22 in the visible light region. At 3.3 eV that is in the blue region and indicated by the dotted line 31, absorptions by $Cs_4W_{11}O_{35}$ and $Cs_6W_{17}O_{54}$, that have a narrow bandgap are high, as governed by interband transition. On the other hand, at 1.6 eV that is in the red region and indicated by the dotted line 32, it can be seen that absorption by $Cs_4W_{12}O_{35}$ is high, under the effect of the skirt of the surface plasmon absorption spectrum. It is predicted that the transmitted light in the red region descends in the descending order of $\Omega_{SP}$. It is considered that the reason why the cesium tungsten oxide contained in the near-infrared absorbing particles that can be favorably used in a near-infrared curable ink composition according to the present embodiment has a saved blueness compared with traditionally used cesium tungsten oxides is because use of W- and O-lost $nCs_2O \cdot mWO_3$ (where $3.6 \leq m/n \leq 9.0$) as a raw material leads to formation of W loss-including $Cs_{0.33}W_{1-y}O_{3-z}$ phase, and to increase in absorption at the high energy side. Adjusting high-temperature reduction of $nCs_2O \cdot mWO_3$ (where $3.6 \leq m/n \leq 9.0$) enables adjustment of the bluish color tone through adjustment of the amount of electrons to be injected into the conduction band. It is confirmed that the near-infrared absorbing effect is maintained in a relatively high state through the adjustment.

(Method for Producing Near-Infrared Absorbing Particles)

The method for producing the near-infrared absorbing particles according to the present embodiment is not particularly limited, and any method that can produce near-infrared absorbing particles that satisfy the properties described above may be used without limitation. Here, one configuration example of the method for producing the near-infrared absorbing particles will be described.

The method for producing the near-infrared absorbing particles according to the present embodiment may include, for example, the following steps.

A cesium tungsten oxide precursor synthesizing step of synthesizing a cesium tungsten oxide precursor, which is a cesium-containing tungstate A heating/reducing step of heating and reducing the cesium tungsten oxide precursor in a reductive gas atmosphere at 650° C. or higher and 950° C. or lower Each step will be described below.

(1) Cesium Tungsten Oxide Precursor Synthesizing Step

In the cesium tungsten oxide precursor synthesizing step, a cesium tungsten oxide precursor, which is a cesium-containing tungstate, i.e., a cesium tungstate, can be synthesized. In a case where a cesium tungsten oxide precursor is already synthesized, the method for producing the near-infrared absorbing particles according to the present embodiment may start from the heating/reducing step.

It is preferable that the cesium tungsten oxide precursor, which is a cesium tungstate, is a powder of a crystal of a $nCs_2O \cdot mWO_3$ (where n and m are integers, $3.6 \leq m/n \leq 9.0$). As the cesium tungsten oxide precursor, which is a cesium tungstate, a stable cesium tungstate is more preferable. A stable cesium tungstate may be one or more selected from, for example, $Cs_4W_{11}O_{35}$, $Cs_2W_6O_{19}$, $Cs_6W_{20}O_{63}$, $Cs_2W_7O_{22}$, and $Cs_6W_{11}O_{36}$. It is more preferable that the cesium tungsten oxide precursor is a cesium tungsten oxide precursor containing a $Cs_4W_{11}O_{35}$ phase as a main phase in particular.

It is possible to prepare these cesium tungstates by, for example, burning a raw material powder mixture containing cesium and tungsten in the open air at 700° C. or higher and 1,000° C. or lower. The method for producing a cesium tungstate is not limited to the mode described above, and any other methods such as a sol-gel method and a polymerized complex method may be used.

As the cesium tungstate used as the starting raw material, a nonequilibrium tungstate obtained by a gas phase synthesis may be used. Examples of the nonequilibrium tungstate include a powder obtained by a thermal plasma method and a powder obtained by electron beam melting.

(2) Heating/Reducing Step

The cesium tungsten oxide precursor as the starting substance described above, specifically, a cesium tungstate having one or more crystal structures selected from, for example, an orthorhombic crystal, a monoclinic crystal, and a pseudohexagonal crystal can be subjected to the heating/reducing step.

In the heating/reducing step, the cesium tungsten oxide precursor described above can be heated and reduced in a reductive gas atmosphere at 650° C. or higher and 950° C. or lower. Through the heating/reducing step, near-infrared absorbing particles containing a cesium tungsten oxide having a desired composition are obtained.

It is preferable to perform the heating/reducing process in an airflow of a reductive gas. As the reductive gas, a mixed gas containing a reductive gas such as hydrogen, and one or more inert gases selected from, for example, nitrogen and argon may be used. Moreover, heating in a water vapor atmosphere or a vacuum atmosphere, or any other mild heating/reducing conditions may be used in combination.

The method for producing the near-infrared absorbing particles according to the present embodiment is not particularly limited to the mode described above. As the method for producing the near-infrared absorbing particles, various methods that can form a predetermined structure including minute structures for defects may be used. Examples of the method for producing the near-infrared absorbing particles include a method of reducing a tungstate obtained by a solid phase method, a liquid phase method, and a gas phase method, and a method of reducing $WO_3$ in a molten alkali halide.

The method for producing the near-infrared absorbing particles may further include desirably selected steps.

(3) Pulverizing Step

As described above, it is preferable that the near-infrared absorbing particles are minutely prepared as particles. Hence, the method for producing the near-infrared absorbing particles may include a pulverizing step of pulverizing the powder obtained in the heating/reducing step.

The method for pulverization to a minute form is not particularly limited, and various methods for mechanical pulverization may be used. As the mechanical pulverizing method, a dry pulverizing method using, for example, a jet mill may be used. Moreover, mechanical pulverization may be performed in a solvent in a process of obtaining a near-infrared absorbing particle dispersion liquid described below. In this case, the pulverizing step can be rephrased as a pulverizing/dispersing step because the near-infrared absorbing particles are dispersed in a liquid medium in the pulverizing step.

(4) Coating Step

As described above, the surface of the near-infrared absorbing particles may be coated with a compound containing one or more kinds of atoms selected from Si, Ti, Zr, Al, and Zn. Hence, the method for producing the near-infrared absorbing particles may further include, for example, a coating step of coating the near-infrared absorbing particles with a compound containing one or more kinds of atoms selected from Si, Ti, Zr, Al, and Zn.

The specific conditions for coating the near-infrared absorbing particles in the coating step are not particularly limited. For example, an alkoxide containing one or more kinds of atoms selected from the group of atoms (or the group of metals) specified above may be added to the near-infrared absorbing particles to be modified, to form a coating film over the surface of the near-infrared absorbing particles.

[2] Near-Infrared Absorbing Particle Dispersion Liquid

Next, one configuration example of a near-infrared absorbing particle dispersion liquid according to the present embodiment will be described.

The near-infrared absorbing particle dispersion liquid according to the present embodiment may also be used when producing, for example, a near-infrared curable ink composition described below.

The near-infrared absorbing particle dispersion liquid according to the present embodiment may contain the near-infrared absorbing particles described above, and one or more liquid media selected from water, organic solvents, oils and fats, liquid resins, and liquid plasticizers. It is preferable that the near-infrared absorbing particle dispersion liquid has a configuration in which the near-infrared absorbing particles are dispersed in the liquid medium.

As the liquid medium, as described above, one or more selected from water, organic solvents, oils and fats, liquid resins, and liquid plasticizers may be used.

The organic solvent may be selected from various organic solvents such as alcohol-based, ketone-based, hydrocarbon-based, and glycol-based organic solvents. Specific examples of the organic solvent include one or more selected from: alcohol-based solvents such as isopropyl alcohol, methanol, ethanol, 1-propanol, isopropanol, butanol, pentanol, benzyl alcohol, diacetone alcohol, and 1-methoxy-2-propanol; ketone-based solvents such as dimethyl ketone, acetone, methyl ethyl ketone, methyl propyl ketone, methyl isobutyl ketone, cyclohexanone, and isophorone; ester-based solvents such as 3-methyl-methoxy-propionate, and butyl acetate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, and propylene glycol ethyl ether acetate; amides such as formamide, N-methyl formamide, dimethyl formamide, dimethyl acetamide, and N-methyl-2-pyrrolidon; aromatic hydrocarbons such as toluene and xylene; and halogenated hydrocarbons such as ethylene chloride and chlorobenzene.

That said, organic solvents having a low polarity are preferable among these organic solvents. Particularly, for example, isopropyl alcohol, ethanol, 1-methoxy-2-propanol, dimethyl ketone, methyl ethyl ketone, methyl isobutyl ketone, toluene, propylene glycol monomethyl ether acetate, and n-butyl acetate are more preferable. These organic solvents may be used alone or in combination of two or more.

As the fat or oil, for example, one or more selected from: drying oils such as linseed oil, sunflower oil, and wood oil; semidrying oils such as sesame oil, cotton seed oil, canola oil, soybean oil, and rice bran oil; non-drying oil such as olive oil, palm oil, and dehydrated castor oil; fatty acid monoesters obtained from a direct ester reaction between vegetable oil fatty acids and monoalcohols; ethers; and ISOPAR (registered trademark) E, EXXSOL (registered trademark) Hexane, Heptane, E, D30, D40, D60, D80, D95, D110, and D130 (all available from Exxon Mobile Corporation) may be used.

As the liquid resin, for example, one or more selected from liquid acrylic resins, liquid epoxy resins, liquid polyester resins, and liquid urethane resins may be used.

As the liquid plasticizer, for example, a liquid plasticizer for a plastic may be used.

The components contained in the near-infrared absorbing particle dispersion liquid are not limited to the near-infrared absorbing particles described above the liquid medium. A desirably selected component may further be added and contained in the near-infrared absorbing particle dispersion liquid as needed.

For example, an acid or alkali may be added to the near-infrared absorbing particle dispersion liquid as needed, to adjust the pH of the dispersion liquid.

In order to better improve the dispersion stability of the near-infrared absorbing particles in the near-infrared absorbing particle dispersion liquid described above and to avoid increase in the dispersed particle diameter due to reaggregation, various surfactants or coupling agents may be added as dispersants to the near-infrared absorbing particle dispersion liquid.

The dispersant such as the surfactant or the coupling agent may be selected in accordance with the intended purpose. Yet, it is preferable that the dispersant contains one or more selected from an amine-containing group, a hydroxyl group, a carboxyl group, and an epoxy group as a functional group. These functional groups have an effect of adsorbing to the surface of the near-infrared absorbing particles to inhibit their aggregation and to keep the near-infrared absorbing particles uniformly dispersed in, for example, an infrared shielding film such as a near-infrared cured film formed by using the near-infrared absorbing particles. A polymeric dispersant containing one or more selected from the functional groups (a group of functional groups) specified above in a molecule is more preferable.

Examples of commercially available dispersants that can be used favorably include one or more selected from: SOLSPERSE (registered trademark) 9000, 12000, 17000, 20000, 21000, 24000, 26000, 27000, 28000, 32000, 35100, 54000, and 250 (available from Lubrizol Japan Ltd.); EFKA (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, and 8503 (available from Efka Additives B.V.); AJISPER (registered trademark) PA111, PB821, PB822, and PN411, and FAMEX L-12 (available from Ajinomoto Fine-Techno Co., Inc.); DisperBYK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, and 430 (available from Byk-Chemie Japan K.K.); DISPARLON (registered trademark) 1751N, 1831, 1850, 1860, 1934, DA-400N, DA-703-50, DA-725, DA-705, DA-7301, DN-900, NS-5210, and NVI-8514L (available from Kusumoto Chemicals, Ltd.); ARUFON (registered trademark) UC-3000, UF-5022, UG-4010, UG-4035, and UG-4070 (available from Toagosei Co., Ltd.).

The method for dispersing the near-infrared absorbing particles in the liquid medium is not particularly limited, so long as the method can disperse the near-infrared absorbing particles in the liquid medium. Here, it is preferable that the near-infrared absorbing particles can be dispersed to an average particle diameter of 200 nm or less and more preferably from 0.1 nm or greater and 200 nm or less.

Examples of the method for dispersing the near-infrared absorbing particles in the liquid medium include a dispersion method using devices such as a bead mill, a ball mill, a sand mill, a paint shaker, and an ultrasonic homogenizer. Particularly, it is preferable to pulverize and disperse the near-infrared absorbing particles using a medium stirring mill such as a bead mill, a ball mill, a sand mill, and a paint shaker using media (beads, balls, and Ottawa sand) in order to shorten the time taken to obtain the desired average particle diameter. The pulverization-dispersion treatment using the medium stirring mill can promote dispersion of the near-infrared absorbing particles in the liquid medium, and, at the same time, size reduction to minute particles through collision between the near-infrared absorbing particles and collision of the medium with the near-infrared absorbing particles. This enables the near-infrared absorbing particles to be dispersed as more minute particles, i.e., to be pulverized and dispersed.

The average particle diameter of the near-infrared absorbing particles is preferably 0.1 nm or greater and 200 nm or less as described above. This is because when the average particle diameter is small, light in the visible light range having a wavelength of 400 nm or longer and 780 nm or shorter is less geometrically scattered or Mie-scattered. As a result of such light scattering being less, for example, a near-infrared absorbing particle dispersed body in which the near-infrared absorbing particles are dispersed in, for example, a resin, obtained by using the near-infrared absorbing particle dispersion liquid according to the present embodiment, can avoid being unable to obtain a clear transparency through becoming like frosted glass. That is, when the average particle diameter is 200 nm or less, light scattering by the particles is in a Rayleigh scattering mode in which the above-described geometric scattering or Mie scattering mode is weakened. In the Rayleigh scattering region, light to be scattered is proportional to the sixth power of the dispersed particle diameter, meaning decrease in light to be Rayleigh-scattered and improvement of transparency along with decrease in the dispersed particle diameter. The average particle diameter of 100 nm or less is preferable because light to be scattered is very little.

The near-infrared absorbing particles in a near-infrared absorbing particle dispersed body in which the near-infrared absorbing particles are dispersed in a solid medium such as a resin, obtained by using the near-infrared absorbing particle dispersion liquid according to the present embodiment, are not in a dispersed state in which they aggregate to become greater than the average particle diameter of the near-infrared absorbing particles in the dispersion liquid, so long as the dispersion liquid is added to the solid medium by a publicly-known adding method.

When the average particle diameter of the near-infrared absorbing particles is 0.1 nm or greater and 200 nm or less, a near-infrared absorbing particle dispersed body to be produced or a molded body thereof (e.g., a plate and a sheet) can avoid being a gray system having a monotonically decreasing transmittance.

The content of the near-infrared absorbing particles in the near-infrared absorbing particle dispersion liquid according to the present embodiment is not particularly limited, yet is preferably, for example, 0.01% by mass or greater and 80% by mass or less. This is because a sufficient solar radiation absorptivity can be exhibited when the content of the near-infrared absorbing particles is 0.01% by mass or greater, and because the near-infrared absorbing particles can be uniformly dispersed in the dispersion medium when the content of the near-infrared absorbing particles is 80% by mass or less.

[3] Near-Infrared Curable Ink Composition

A near-infrared curable ink composition according to the present embodiment will be described.

The near-infrared curable ink composition according to the present embodiment may contain a thermosetting resin or a thermoplastic resin and near-infrared absorbing particles. As the near-infrared absorbing particles, the near-infrared absorbing particles described above may be used. Hence, the near-infrared absorbing particles may contain a cesium tungsten oxide having an orthorhombic or hexagonal crystal structure and represented by, for example, a general formula: $Cs_xW_{1-y}O_{3-z}$ (where $0.2 \leq x \leq 0.4$, $0<y \leq 0.4$, $0<z \leq 0.46$). The thermosetting resin may be in an uncured state, specifically, for example, a flowable state.

The components contained in the near-infrared curable ink composition according to the present embodiment will be described below.

(1) Resin Component

The near-infrared curable ink composition according to the present embodiment may contain a resin component, specifically, a thermosetting resin or a thermoplastic resin.

(1-1) Thermosetting Resin

The thermosetting resin is not particularly limited. For example, one or more selected from epoxy resins, urethane resins, acrylic resins, urea resins, melamine resins, phenol resins, ester resins, polyimide resins, silicone resins, and unsaturated polyester resins may be used.

These thermosetting resins are resins that cure in response to application of thermal energy from the near-infrared absorbing particles irradiated with near-infrared rays, and are uncured resins. The thermosetting resins may contain a monomer or an oligomer that forms a thermosetting resin through a curing reaction, and a publicly-known curing agent that may be appropriately added. A publicly-known curing accelerator may be added to the curing agent.

(1-2) Thermoplastic Resin

As the thermoplastic resins, for example, one or more selected from polyester resins, polycarbonate resins, acrylic resins, polystyrene resins, polyamide resins, vinyl chloride resins, olefin resins, fluoro-resins, polyvinyl acetate resins, thermoplastic polyurethane resins, acrylonitrile butadiene styrene resins, polyvinyl acetal resins, acrylonitrile/styrene copolymer resins, and ethylene/vinyl acetate copolymer resins may be used.

These thermoplastic resins are melted once in response to application of thermal energy from the near-infrared absorbing particles irradiated with near-infrared rays, and can cure to a desired shape by the subsequent cooling.

(2) Near-Infrared Absorbing Particles

As the near-infrared absorbing particles, the near-infrared absorbing particles described above may be used. Description of the near-infrared absorbing particles will be omitted here, as the near-infrared absorbing particles have been already described.

The content of the near-infrared absorbing particles in the near-infrared curable ink composition according to the present embodiment is not particularly limited and may be selected in accordance with, for example, properties required of the near-infrared curable ink composition.

The amount of the near-infrared absorbing particles to be contained in the near-infrared curable ink composition according to the present embodiment may be selected such that the uncured thermosetting resin can cure in a curing reaction. The amount of the near-infrared absorbing particles to be contained in the near-infrared curable ink composition according to the present embodiment may be selected such that the thermoplastic resin melts in a hot-melting reaction.

The amount of the near-infrared absorbing particles per coating area of the near-infrared curable ink composition may be selected and determined, considering also the coating thickness to which the near-infrared curable ink composition is applied.

The method for dispersing the near-infrared absorbing particles in the near-infrared curable ink composition is not particularly limited, and for example, it is preferable to use a wet medium mill.

(3) Other Components

The near-infrared curable ink composition according to the present embodiment may be made only of the resin component and the near-infrared absorbing particles, yet may further contain desirably selected components, and may contain, for example, a pigment, a dye, a dispersant, and a solvent described below in accordance with the intended purpose. Even when the near-infrared curable ink composition is made only of the resin component and the near-infrared absorbing particles as described above, this does not exclude the near-infrared curable ink composition containing unavoidable components that may mix due to a production process.

(3-1) Pigment and Dye

As described above, the near-infrared curable ink composition according to the present embodiment may further contain one or more selected from organic pigments, inorganic pigments, and dyes for coloring the ink composition.

(3-1-1) Pigment

The pigment is not particularly limited, and a publicly-known pigment may be used without particular limitations. One or more selected from, for example, organic pigments such as insoluble pigments and lake pigments, and inorganic pigments such as carbon black can be favorably used.

It is preferable that such a pigment is present in the near-infrared curable ink composition according to the present embodiment in a dispersed state. As the method for dispersing the pigment, a publicly-known method may be used without any limitations.

The insoluble pigment is not particularly limited. For example, azo, azomethine, methine, diphenylmethane, triphenylmethane, quinacridone, anthraquinone, perylene, indigo, quinophthalone, isoindolinone, azine, oxazine, thiazine, dioxazine, thiazole, phthalocyanine, and diketopyrrolopyrrole may be used.

The organic pigment is not particularly limited. The specific names of the pigments that can be favorably used will follow.

Examples of magenta or red pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of orange or yellow pigments include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

Examples of green or cyan pigments include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Examples of black pigments include C.I. Pigment Black 1, C.I. Pigment Black 6, and C.I. Pigment Black 7.

The inorganic pigment is not particularly limited. For example, extender pigments such as carbon black, titanium dioxide, zinc sulfide, zinc oxide, zinc phosphate, mixed metal oxide/phosphate, iron oxide, manganese-iron oxide, chromium oxide, ultramarine, nickel or chromium antimony titanium oxide, cobalt oxide, aluminum, aluminum oxide, silicon oxide, silicate, zirconium oxide, cobalt and aluminum mixed oxide, molybdenum sulfide, a rutile mixed phase pigment, sulfides of rare-earth elements, bismuth vanadate, aluminum hydroxide, and barium sulfate can be used favorably.

The average dispersed particle diameter of a dispersed-state pigment contained in the near-infrared curable ink composition according to the present invention is not particularly limited, yet is preferably 1 nm or greater and 100 nm or less. This is because the storage stability of the pigment in the near-infrared curable ink composition is particularly good when the average dispersed particle diameter of the pigment dispersion liquid is 1 nm or greater and 100 nm or less. The average dispersed particle diameter can be measured using, for example, ELS-8000 available from Otsuka Electronics Co., Ltd., which is a particle diameter measuring instrument based on a dynamic light scattering method.

(3-1-2) Dye

The dye is not particularly limited. Any of oil-soluble dyes and water-soluble dyes may be used. For example, yellow dyes, magenta dyes, and cyan dyes can be favorably used.

Examples of the yellow dye include: aryl or heteryl azo dyes containing, as coupling components, phenols, naphthols, anilines, pyrazolones, pyridones, and open-chain active methylene compounds; azomethine dyes containing, as coupling components, open-chain active methylene compounds; methine dyes such as benzylidene dyes and monomethine oxonol dyes; and quinone-based dyes such as naphthoquinone dyes and anthraquinone dyes. Examples of other dye types include quinophthalone dyes, nitro/nitroso dyes, acridine dyes, and acridinone dyes. These dyes may be the types that need their chromophore to partly dissociate in order for them to develop yellow. In this case, the counter cation may be an inorganic cation such as of alkali metals and ammonium, an organic cation such as of pyridinium and quaternary ammonium salts, and a polymer cation that contains any of these as a partial structure.

Examples of the magenta dye include: aryl or heteryl azo dyes containing, as coupling components, phenols, naphthols, and anilines; azomethine dyes containing, as coupling components, pyrazolones and pyrazolotriazoles; methine dyes such as arylidene dyes, styryl dyes, merocyanine dyes, and oxonol dyes; carbonium dyes such as diphenylmethane dyes, triphenylmethane dyes, and xanthene dyes; quinone-based dyes such as naphthoquinone, anthraquinone, and anthrapyridone; and condensed polycyclic dyes such as dioxazine. These dyes may be the types that need their chromophore to partly dissociate in order for them to develop magenta. In this case, the counter cation may be an inorganic cation such as of alkali metals and ammonium, an organic cation such as of pyridinium and quaternary ammonium salts, and a polymer cation that contains any of these as a partial structure.

Examples of the cyan dyes include: azomethine dyes such as indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes containing, as coupling components, phenols, naphthols, and anilines; and indigo/thioindigo dyes. These dyes may be the types that need their chromophore to partly dissociate in order for them to develop cyan. In this case, the counter cation may be an inorganic cation such as of alkali metals and ammonium, an organic cation such as of pyridinium and quaternary ammonium salts, and a polymer cation that contains any of these as a partial structure. Moreover, black dyes such as polyazo dyes may also be used.

The water-soluble dyes are not particularly limited. For example, direct dyes, acid dyes, food dyes, basic dyes, and reactive dyes can be favorably used.

The specific names of dyes that can be favorably used as the water-soluble dye will follow.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326, C.I. Acid Black 7, 24, 29, 48, 52:1, and 172, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Reactive Yellow 2, 3, 13, 14, 15, 17, 18, 23, 24, 25, 26, 27, 29, 35, 37, 41, and 42, C.I. Reactive Blue 2, 3, 5, 8, 10, 13, 14, 15, 17, 18, 19, 21, 25, 26, 27, 28, 29, and 38, C.I. Reactive Black 4, 5, 8, 14, 21, 23, 26, 31, 32, and 34, C.I. Basic Red 12, 13, 14, 15, 18, 22, 23, 24, 25, 27, 29, 35, 36, 38, 39, 45, and 46, C.I. Basic Violet 1, 2, 3, 7, 10, 15, 16, 20, 21, 25, 27, 28, 35, 37, 39, 40, and 48, C.I. Basic Yellow 1, 2, 4, 11, 13, 14, 15, 19, 21, 23, 24, 25, 28, 29, 32, 36, 39, and 40, C.I. Basic Blue 1, 3, 5, 7, 9, 22, 26, 41, 45, 46, 47, 54, 57, 60, 62, 65, 66, 69, and 71, C.I. Basic Black 8

It is preferable to set the particle diameter of, for example, the pigment serving as a colorant described above, considering the mechanics of the coating device for the near-infrared curable ink composition.

(3-2) Dispersant

The near-infrared curable ink composition according to the present embodiment may further contain a dispersant. That is, the near-infrared absorbing particles described above may be dispersed together with the dispersant in the thermosetting resin, the thermoplastic resin, and a solvent described below, which is a desirably selectable component. By adding the dispersant, it is easy to disperse the near-infrared absorbing particles in the near-infrared curable ink composition. Moreover, when curing a coating film of the near-infrared curable ink composition, it is possible to inhibit curing variation in particular.

The dispersant used in the near-infrared curable ink composition according to the present embodiment is not particularly limited, and for example, a desirably selected commercially available dispersant may be used. Yet, a dispersant that has a molecular structure containing a polyester-based, polyacrylic-based, polyurethane-based, polyamine-based, polycaprolactone-based, or polystyrene-based main chain and an amino group, epoxy group, a carboxyl group, a hydroxyl group, or a sulfo group as a functional group is preferable, because a dispersant having such a molecular structure does not readily denature while a coating film of the near-infrared curable ink composition according to the present embodiment is irradiated with near-infrared rays for some tens of seconds intermittently, and it is possible to inhibit occurrence of trouble such as coloring due to the denaturation in particular.

Specific examples of commercially available dispersants that can be favorably used include: SOLSPERSE3000, SOLSPERSE9000, SOLSPERSE11200, SOLSPERSE13000, SOLSPERSE13240, SOLSPERSE13650, SOLSPERSE13940, SOLSPERSE16000, SOLSPERSE17000, SOLSPERSE18000, SOLSPERSE20000, SOLSPERSE21000, SOLSPERSE24000SC, SOLSPERSE24000GR, SOLSPERSE26000, SOLSPERSE27000, SOLSPERSE28000, SOLSPERSE31845, SOLSPERSE32000, SOLSPERSE32500, SOLSPERSE32550, SOLSPERSE32600, SOLSPERSE33000, SOLSPERSE33500, SOLSPERSE34750, SOLSPERSE35100, SOLSPERSE35200, SOLSPERSE36600, SOLSPERSE37500, SOLSPERSE38500, SOLSPERSE39000, SOLSPERSE41000, SOLSPERSE41090, SOLSPERSE53095, SOLSPERSE55000, SOLSPERSE56000, and SOLSPERSE76500 available from Lubrizol Japan Limited;

Disperbyk-101, Disperbyk-103, Disperbyk-107, Disperbyk-108, Disperbyk-109, Disperbyk-110, Disperbyk-111, Disperbyk-112, Disperbyk-116, Disperbyk-130, Disperbyk-140, Disperbyk-142, Disperbyk-145, Disperbyk-154, Disperbyk-161, Disperbyk-162, Disperbyk-163, Disperbyk-164, Disperbyk-165, Disperbyk-166, Disperbyk-167, Disperbyk-168, Disperbyk-170, Disperbyk-171, Disperbyk-174, Disperbyk-180, Disperbyk-181, Disperbyk-182, Disperbyk-183, Disperbyk-184, Disperbyk-185, Disperbyk-190, Disperbyk-2000, Disperbyk-2001, Disperbyk-2020, Disperbyk-2025, Disperbyk-2050, Disperbyk-2070, Disperbyk-2095, Disperbyk-2150, Disperbyk-2155, Anti-Terra-U, Anti-Terra-203, Anti-Terra-204, BYK-P104, BYK-P104S, BYK-220S, and BYK-6919 available from Byk-Chemie Japan K.K.;

EFKA4008, EFKA4046, EFKA4047, EFKA4015, EFKA4020, EFKA4050, EFKA4055, EFKA4060, EFKA4080, EFKA4300, EFKA4330, EFKA4400, EFKA4401, EFKA4402, EFKA4403, EFKA4500, EFKA4510, EFKA4530, EFKA4550, EFKA4560, EFKA4585, EFKA4800, EFKA5220, EFKA6230, JONCRYL67, JONCRYL678, JONCRYL586, JONCRYL611, JONCRYL680, JONCRYL682, JONCRYL690, JONCRYL819, and JONCRYL-JDX5050 available from BASF Japan Ltd.; and AJISPER PB-711, AJISPER PB-821, and AJISPER PB-822 available from Ajinomoto Fine-Techno Co., Inc.

As the dispersant, the dispersant specified in the description of the near-infrared absorbing particle dispersion liquid may also be used.

(3-3) Solvent

In the near-infrared curable ink composition according to the present embodiment, a solvent may be used together with the thermosetting resin or the thermoplastic resin. That is, the near-infrared curable ink composition according to the present embodiment may further contain a solvent.

In this case, as the solvent of the near-infrared curable ink composition, for example, it is preferable to use a reactive organic solvent containing a functional group such as an epoxy group that, in a curing reaction of the thermosetting resin, reacts with the monomer or oligomer of the thermosetting resin contained in the thermosetting resin that is in an uncured state.

By adding the solvent, it is possible to adjust the viscosity of the near-infrared curable ink composition. By adjusting the viscosity of the near-infrared curable ink composition, it is possible to secure coatability of the near-infrared curable ink composition and smoothness of a coating film easily.

The solvent is not particularly limited. For example, various organic solvents such as water, alcohols such as methanol, ethanol, propanol, butanol, isopropyl alcohol, isobutyl alcohol, and diacetone alcohol, ethers such as methyl ether, ethyl ether, and propyl ether, esters, ketones such as acetone, methyl ethyl ketone, diethyl ketone, cyclohexanone, and isobutyl ketone, and ethylene glycol monoethyl ether, ethylene glycol monobutyl ether, polyethylene glycol, and polypropylene glycol may be used.

As the solvent, the liquid medium specified in the description of the near-infrared absorbing particle dispersion liquid may also be used.

[4] Method for Producing Near-Infrared Curable Ink Composition

As described above, the near-infrared curable ink composition according to the present embodiment can be prepared by adding the near-infrared absorbing particles in the thermosetting resin or the thermoplastic resin that is uncured. The near-infrared curable ink composition according to the present embodiment may optionally be prepared by dispersing the near-infrared absorbing particles in an appropriate solvent, and subsequently adding the thermosetting resin or the thermoplastic resin that is uncured. The near-infrared curable ink composition according to the present embodiment can also be prepared by adding the thermosetting resin or the thermoplastic resin that is uncured to the near-infrared absorbing particle dispersion liquid described above.

Because the near-infrared curable ink composition according to the present embodiment contains the near-infrared absorbing particles described above, a cured film obtained by applying it over, for example, a base material and irradiating it with near-infrared rays can have a more neutral color tone. Moreover, because the near-infrared absorbing particles described above have an excellent near-infrared absorbing property, they can supply sufficient heat when irradiated with, for example, near-infrared rays, and can sufficiently increase close adhesiveness of the cured film to be obtained with the base material.

With the near-infrared curable ink composition according to the present embodiment, it is possible to form a three-dimensional model over a base material. That is, the near-infrared curable ink composition according to the present embodiment is also best fitted for stereolithography for forming three-dimensional models.

As described above, the viscosity of the near-infrared curable ink composition according to the present embodiment is adjustable when a solvent is contained. Hence, it is possible to increase the handleability of the near-infrared curable ink composition when applying it over, for example, a base material.

However, as described above, the near-infrared curable ink composition according to the present embodiment may be free of a solvent. When the near-infrared curable ink composition according to the present embodiment is free of a solvent, an operation for, for example, volatilizing the solvent can be omitted. Hence, it is possible to increase the efficiency when curing a coated product of the near-infrared curable ink composition.

When the near-infrared curable ink composition according to the present embodiment contains a solvent, the method for removing the solvent after the near-infrared curable ink composition is applied is not particularly limited, and, for example, a heating evaporation method including a decompression operation may be employed.

[Near-Infrared Cured Film]

A near-infrared cured film according to the present embodiment may be a cured product of the near-infrared curable ink composition described above.

The near-infrared cured film according to the present embodiment can be produced by, for example, a method for producing a near-infrared cured product described below.

Specifically, after the near-infrared curable ink composition described above is applied over a surface of, for example, a base material (coating step), for example, the solvent is removed as needed, and the remaining product is irradiated with near-infrared rays, enabling the near-infrared curable ink composition to be cured (curing step).

The coating step and the curing step may be performed repeatedly. This makes it possible to obtain a near-infrared cured film having a desired shape and a desired size. Moreover, it is possible to form a three-dimensional model over a base material. In this case, the obtained product may be referred to as a near-infrared cured product.

[Method for Producing Near-Infrared Cured Product]

A method for producing a near-infrared cured product according to the present embodiment may include a coating step and a curing step described below.

In the coating step, the near-infrared curable ink composition described above can be applied over a base material, to form a coating film.

In the curing step, the coating film can be irradiated with near-infrared rays, to cure the near-infrared curable ink composition.

The near-infrared curable ink composition described above has visible light transmittance. Hence, by applying the near-infrared curable ink composition to obtain a coating film, and curing the coating film by irradiation with near-infrared rays, it is possible to obtain a near-infrared cured film that exhibits excellent close adhesiveness with a predetermined substrate.

Moreover, by adding at least one or more pigments and dyes to the near-infrared curable ink composition, it is possible to obtain a colored film. Since the near-infrared absorbing particles almost do not have any effects on the color tone of the colored film, the colored film can be used as a color filter of, for example, a liquid crystal display.

Factors that are considered to enable the excellent close adhesiveness of the near-infrared cured film according to the present embodiment include the near-infrared absorbing particles' absorption of the near-infrared rays with which they are irradiated and their consequent heat generation, promotion of a reaction such as a polymerization reaction, a condensation reaction, or an addition reaction of, for example, the monomer or oligomer contained in the uncured thermosetting resin by the thermal energy of the generated heat, and a consequently induced curing reaction of the thermosetting resin. Other factors that are considered to enable the excellent close adhesiveness of the near-infrared cured film according to the present embodiment include sufficient heat supply through the near-infrared absorbing particles' heat generation in response to the near-infrared irradiation, and consequently induced curing of the thermoplastic resin by melting and cooling.

The near-infrared curable ink composition described above may contain a solvent. It is possible to volatilize, for example, the solvent, through heat generation by the near-infrared absorbing particles.

When the near-infrared curable ink composition described above contains a thermosetting resin as a resin component, a near-infrared cured film formed using the near-infrared curable ink composition does not re-melt when the cured film is further irradiated with near-infrared rays. This is because the near-infrared cured film containing a cured product of the thermosetting resin does not re-melt even when the near-infrared absorbing particles generate heat by being irradiated with near-infrared rays.

This re-melting resisting property, being enhanced by the above-described excellent close adhesiveness with the base material, is particularly effective when applying the near-infrared curable ink composition according to the present embodiment to stereolithography, in which three-dimensional models are formed by applying the near-infrared curable ink composition and irradiating it with near-infrared rays repeatedly, and laminating cured products of the near-infrared curable ink composition repeatedly.

Each step will be described below.

(1) Coating Step

In the coating step, the near-infrared curable ink composition described above can be applied over a base material, to form a coating film.

The constituent material of the base material over which the near-infrared curable ink composition is applied in the coating step is not particularly limited.

As the base material, one or more kinds of base materials selected from, for example, paper, resins, and glass may be used.

The resin is not particularly limited. For example, one or more selected from polyester such as polyethylene terephthalate (PET), acrylic, urethane, polycarbonate, polyethylene, ethylene/vinyl acetate copolymers, vinyl chloride, fluoro-resins, polyimide, polyacetal, polypropylene, and nylon may be used.

The shape of the base material is not particularly limited. The base material may have a shape suited to a shape required of a near-infrared cured product, and may have, for example, a plate shape.

The method for applying the near-infrared curable ink composition over a surface of the base material is not particularly limited. For example, a dipping method, a flow coating method, a spray method, a bar coating method, a spin coating method, a gravure coating method, a roll coating method, a screen printing method, and a blade coating method may be used.

(2) Curing Step

In the curing step, the coating film can be irradiated with near-infrared rays, to cure the near-infrared curable ink composition.

As the method for curing the near-infrared curable ink composition, infrared irradiation is preferable, and near-infrared irradiation is more preferable. Near-infrared rays have a high energy density, and can efficiently apply energy that is needed for the resin in the near-infrared curable ink composition to cure.

It is also preferable to cure the near-infrared curable ink composition by combining infrared irradiation with a desirably selected method selected from publicly-known methods. For example, such a method as heating, air blowing, or electromagnetic irradiation may be used in combination with infrared irradiation.

In the present specification, infrared rays represent electromagnetic waves having a wavelength in a range of 0.1 μm or greater and 1 mm or less. Near-infrared rays represent infrared rays having a wavelength of 0.75 μm or greater and 4 μm or less. Far-infrared rays represent infrared rays having a wavelength of 4 μm or greater and 1,000 μm or less. In general, the near-infrared curable ink composition can be cured and similar effects can be obtained through irradiation with whichever infrared rays of far-infrared rays and near-infrared rays. Yet, irradiation with near-infrared rays can cure the coating film in a shorter time efficiently.

As described above, when curing the near-infrared curable ink composition, it is possible to irradiate it with electromagnetic waves together with near-infrared rays. Microwaves can be favorably used as the electromagnetic waves. Microwaves represent electromagnetic waves having a wavelength in a range of 1 mm or greater and 1 m or less.

It is preferable that the microwaves with which the near-infrared curable ink composition is irradiated have a power of 200 W or higher and 1,000 W or lower. A power of 200 W or higher can promote vaporization of the organic solvent remaining in the near-infrared curable ink composition. A power of 1,000 W or lower is a mild irradiation condition, and does not have the risk of denaturing the base material or the resin component such as the thermosetting resin contained in the near-infrared curable ink composition.

The time for which the near-infrared curable ink composition is irradiated with infrared rays is not particularly limited because it varies depending on the energy or the wavelength with which the near-infrared curable ink composition is irradiated, the composition of the near-infrared curable ink, and the coating amount of the near-infrared curable ink. For example, typically, the infrared irradiation time is preferably 0.1 seconds or longer. When the irradiation time is 0.1 seconds or longer, it is possible to perform sufficient infrared irradiation in order to cure the near-infrared curable ink composition. By increasing the irradiation time, for example, it is possible to sufficiently dry the solvent contained in the infrared curable ink composition. Yet, when aiming for high-speed printing and coating, the irradiation time is preferably within 30 seconds, and more preferably within 10 seconds.

The radiation source of infrared rays is not particularly limited. Infrared rays may be obtained directly from a heat source, or a heat medium may be interposed and effective infrared radiation may be obtained via the heat medium. For example, infrared rays can be obtained from a mercury, xenon, cesium, or sodium discharge lamp, or from a carbon dioxide laser, or by heating of a platinum, tungsten, nichrome, or kanthal electric resistor. A preferable radiation source is a halogen lamp. Advantages of a halogen lamp include a good thermal efficiency and a quick rising property.

A coating film may be irradiated with infrared rays from the side of the surface of the base material coated with the near-infrared curable ink or from the side of the back surface of the base material opposite to the coated surface. It is also preferable to irradiate both surfaces at the same time, and it is also preferable to combine drying by temperature raising and drying by air blowing. It is more preferable to use a light condensing plate as needed. When these methods are combined, the near-infrared curable ink composition can be cured by infrared irradiation performed for a short time.

The method for producing a near-infrared cured product according to the present embodiment can produce the near-infrared cured film described above. By laminating cured products of the near-infrared curable ink composition repeatedly, it is possible to form a three-dimensional model. That is, by performing the coating step and the curing step (irradiation step) described above repeatedly, it is possible to produce a near-infrared cured body having a desired three-dimensional structure.

It is possible to carry out stereolithography by the method for producing a near-infrared cured body according to the present embodiment. That is, a stereolithography method may include the coating step and the curing step described above.

EXAMPLES

The present invention will be specifically described below by way of Examples. However, the present invention should not be construed as being limited to the Examples below.

Here, the method for evaluating near-infrared absorbing particles in the following Experimental Examples will first be described.

(Chemical Analysis)

A chemical analysis of obtained near-infrared absorbing particles was performed by Atomic Absorption Spectrophotometry (AAS) for Cs, and by ICP Optical Emission Spectrometry (1CP-OES) for W (tungsten). O was analyzed by a method of melting a sample in He gas and determining the quantity of CO gas that had reacted with carbon contained in a crucible by IR absorption spectroscopy, using a light element analyzer (obtained from LECO Japan Corporation, model No. ON-836). In the following Experimental Example 1-1 to Experimental Example 1-13, powders, which were near-infrared absorbing particles containing a W-loss-including cesium tungsten complex oxide, were obtained.

Hence, it was successfully confirmed that a compositional ratio obtained by multiplying a compositional ratio, in a case of W being assumed to be 1, by a value corresponding to the W loss, the value being obtained by, for example, TEM observation, satisfied a general formula: $Cs_xW_{1-y}O_{3-z}$ (where $0.2 \leq x \leq 0.4$, $0 < y \leq 0.4$, $0 < z \leq 0.46$) in all of a powder A to a powder M, which were near-infrared absorbing particles obtained in Experimental Example 1-1 to Experimental Example 1-13.

(X-Ray Diffractometry)

X-ray diffractometry was performed according to powder XRD using an X'Pert-PRO/MPD device obtained from Spectris Co., Ltd. and a Cu-Kα beam.

The measurement was performed after diffraction angle calibration was performed using a standard sample (NIST640e). Then, the obtained XRD diffraction pattern was analyzed by the Rietveld method, to obtain the lattice constants of the crystal phase. The identified crystal phase is indicated in the “Pattern” field of the “X-ray diffractometry result” field of Table 1. “ORTH+HEX” means that an orthorhombic crystal and a hexagonal crystal were both contained. “ORTH” means that an orthorhombic crystal was contained, and “HEX” means that a hexagonal crystal was contained.

In a case of a mixed phase of an orthorhombic crystal and a hexagonal crystal, lattice constants of each phase were obtained. Lattice constants of the orthorhombic crystal were translated to lattice constants of a hexagonal crystal based on the following lattice correspondence model. That is, lattice constants translated in terms of a hexagonal crystal were obtained using formulae: $4a_{orth}^2+b_{orth}^2=64a_{hex}^2=64b_{hex}^2$ and $c_{orth}=c_{hex}$ extracted from the Solodovnikov 1998 model (Non-Patent Document 4) for the correspondence defining lattice changes between an orthorhombic crystal and a hexagonal crystal. In the formulae above, $a_{orth}$, $b_{orth}$, and $c_{orth}$ represent the lengths of the a-axis, the b-axis, and the c-axis of an orthorhombic crystal, and $a_{hex}$, $b_{hex}$, and $c_{hex}$ represent the lengths of the a-axis, the b-axis, and the c-axis of a hexagonal crystal.

Experimental Example 1

Near-infrared absorbing particles to be used in Experimental Example 2 described below were produced, and evaluated.

Experimental Example 1-1

A kneaded product obtained by weighing out cesium carbonate ($Cs_2CO_3$) and tungsten trioxide ($WO_3$) to be at a mole ratio of $Cs_2CO_3$:$WO_3$=2:11, and mixing and kneading them was added into a carbon boat. This was subjected twice to heating in open air using a tube furnace at 850° C. for 20 hours, to obtain a powder A', which was a white powder very slightly wearing a greenish tone. In the heating, after the kneaded product was heated at 850° C. for 20 hours, it was once taken out and pulverized and mixed, before it was re-heated under the same conditions.

The obtained powder A', which was a white powder, was evaluated in the manners described below.

In the X-ray powder diffraction pattern, the obtained powder A', in which $Cs_6W_{11}O_{36}$ was slightly mixed though, was identified to be substantially a $Cs_4W_{11}O_{35}$ single phase (ICDD 00-51-1891).

The measured lattice constants were a=14.6733 Å, b=52.3841 Å, and c=7.7424 Å. These values were very close to a=14.6686 Å, b=52.3971 Å, and c=7.7356 Å, which were the values of Solodovnikov (Non-Patent Document 4). The chemical analytical result of this white powder was $Cs_{0.36}WO_{3.18}$, which was substantially equal to the composition obtained by the weighing out.

Figure 4:
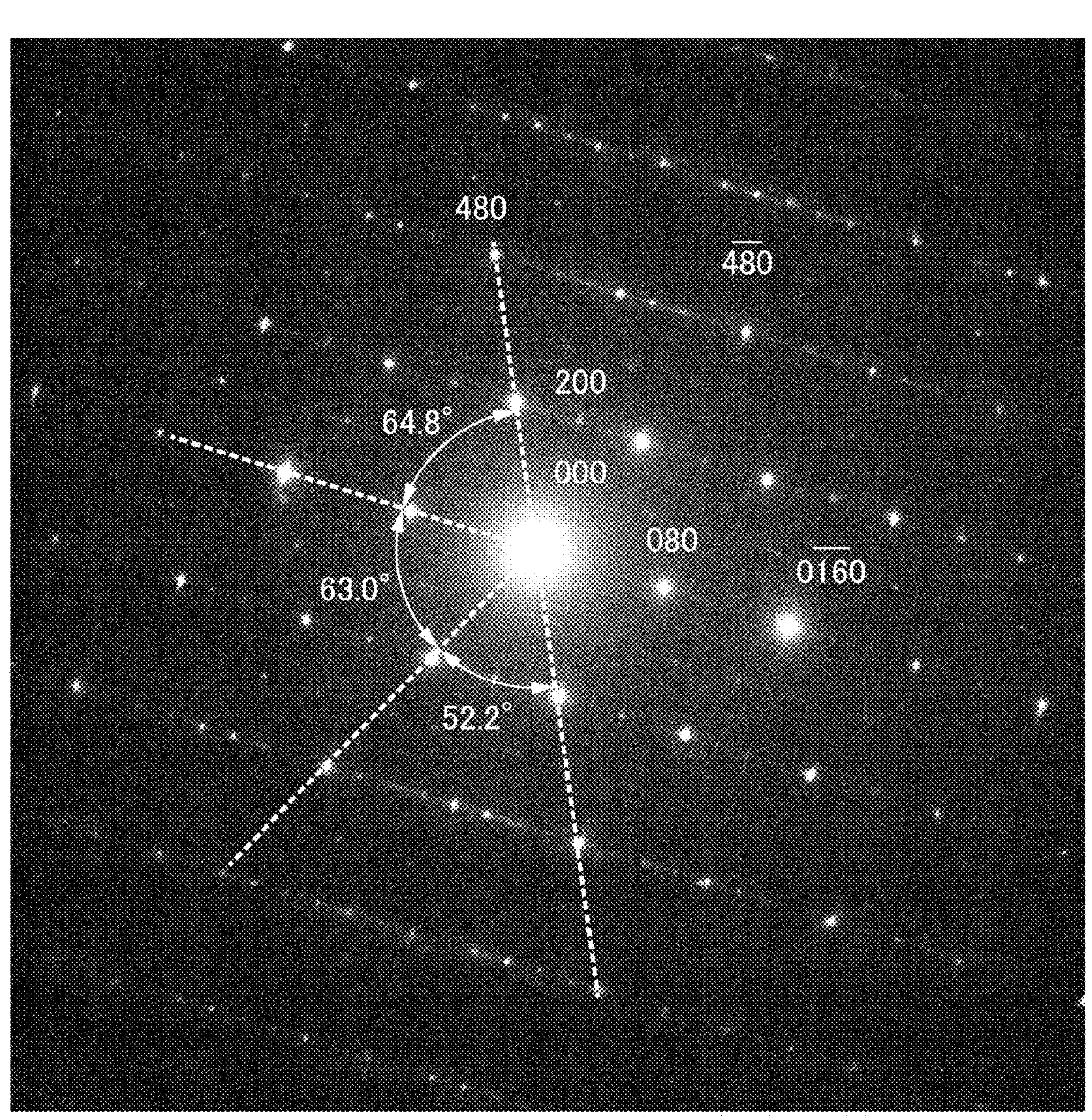
FIG. 4 illustrates an electron beam diffraction image of a powder A' obtained in Experimental Example 1-1 captured in a c-axis direction.

Next, the obtained powder A', which was a white powder, was observed by TEM. A selected area electron beam diffraction pattern that was measured was a spot pattern of an orthorhombic crystal. The spot pattern measured in the direction of the c-axis of the orthorhombic crystal is indicated in FIG. 4. Cyclicity defined by a b/8 cycle appeared in the direction of the b-axis, and presence of W- and O-lost planes was confirmed. Moreover, from the streak running in the direction of the b-axis, a modicum of plane defect in the b-plane was found to be present. This spot pattern about the c-crystal zone axis was close to the six-fold symmetry, but the angle between a (480) spot and a (4-80) spot was 52.2°, which was different from 60° of the six-fold symmetry. This difference from the six-fold symmetry was considered due to the W- and O-lost planes that occurred at the b/8 cycle.

The $Cs_4W_{11}O_{35}$ powder, which was the obtained white powder, was densely sprinkled over a carbon boat thinly and flatly, set in a tube furnace, and heated in an Ar gas airflow from room temperature to 800° C. With the temperature maintained at 800° C., and with the airflow changed to an airflow in which 1 volt (hereinafter, simply % for vol %) of $H_2$ gas was mixed with the carrier Ar gas, the powder was reduced for 5 minutes. Subsequently, only in the Ar gas airflow with the $H_2$ gas stopped, the powder was gradually cooled to 100° C. Subsequently, with the Ar gas airflow stopped, the powder was gradually cooled to room temperature. Then, a powder A was taken out. The color tone of the powder A taken out was pale blue.

The XRD pattern of the powder A was a two-phase mixed pattern of an orthorhombic crystal and a hexagonal crystal. The lattice constants of each phase were obtained by the Rietveld method. As a result, the lattice constants of the orthorhombic crystal were a=14.6609 Å, b=52.4040 Å, and c=7.7419 Å (hexagonal crystal-translated values were a=7.5062 Å and c=7.7419 Å). The lattice constants of the hexagonal crystal were a=7.4170 Å and c=7.5752 Å. It was confirmed that the c-axis values of these crystals were both in the range of 7.560 Å≤c≤7.750 Å.

Next, the powder A was observed by TEM. As a result, orthorhombic crystal particles and pseudohexagonal crystal particles were observed.

Figure 5:
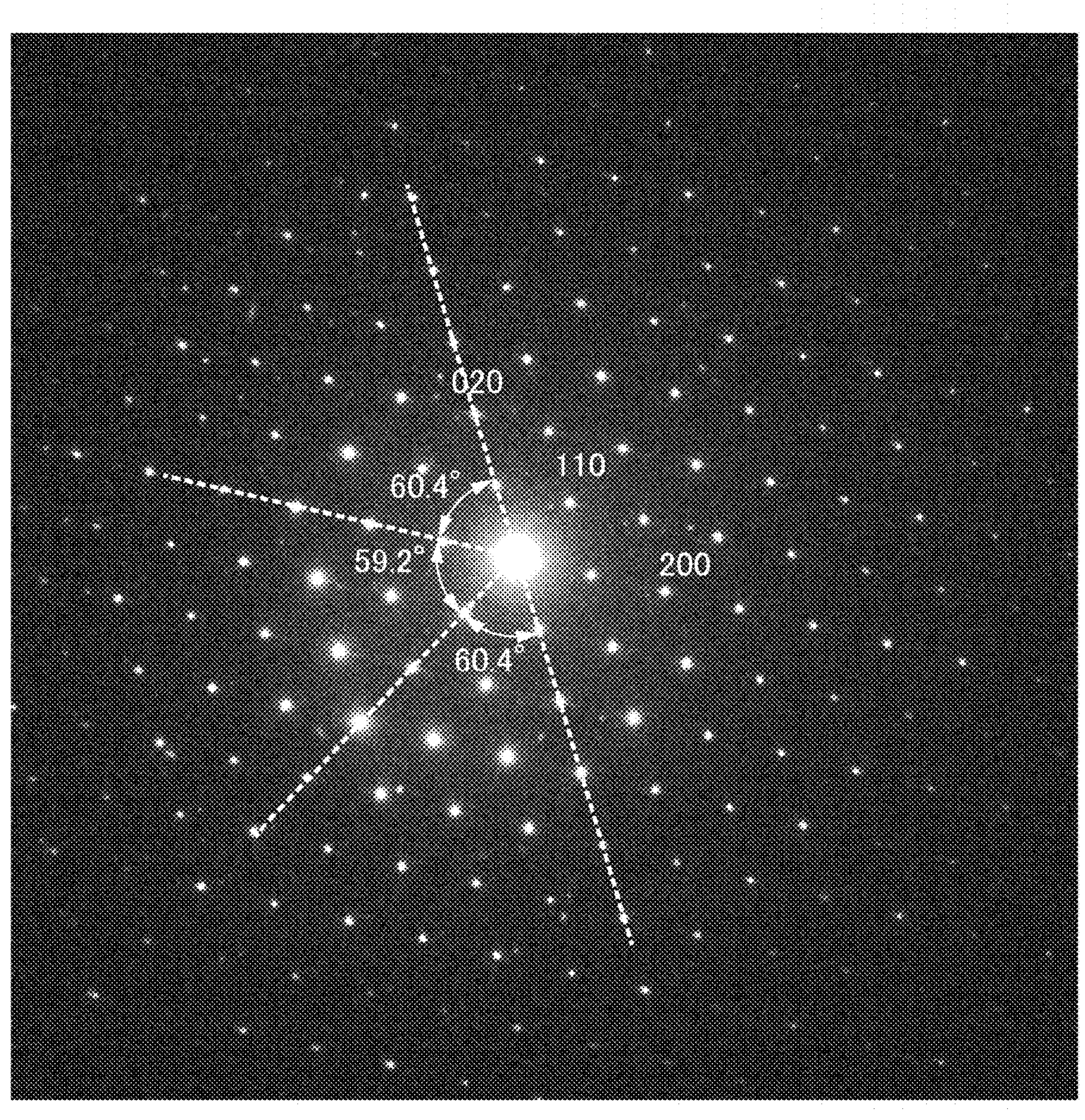
FIG. 5 illustrates an electron beam diffraction image of pseudohexagonal crystal particles of a powder A obtained in Experimental Example 1-1 about a $[001]_{HEX}$ crystal zone axis.

FIG. 5 illustrates the electron beam diffraction image of the pseudohexagonal crystal particles. As indicated by the electron beam diffraction image of FIG. 5 about the $[001]_{HEX}$ crystal zone axis, the pseudohexagonal crystal particles exhibited a diffraction pattern close to that of a hexagonal crystal. Here, the interplanar angle between $(200)_{HEX}$ and $(110)_{HEX}$ measured 59.2°, which was a value very close to that of a hexagonal crystal.

Next, the powder A was observed in a STEM-HAADF mode (STEM: scanning transmission electron microscopy, HAADF: High-angle annular dark field).

Figure 6:
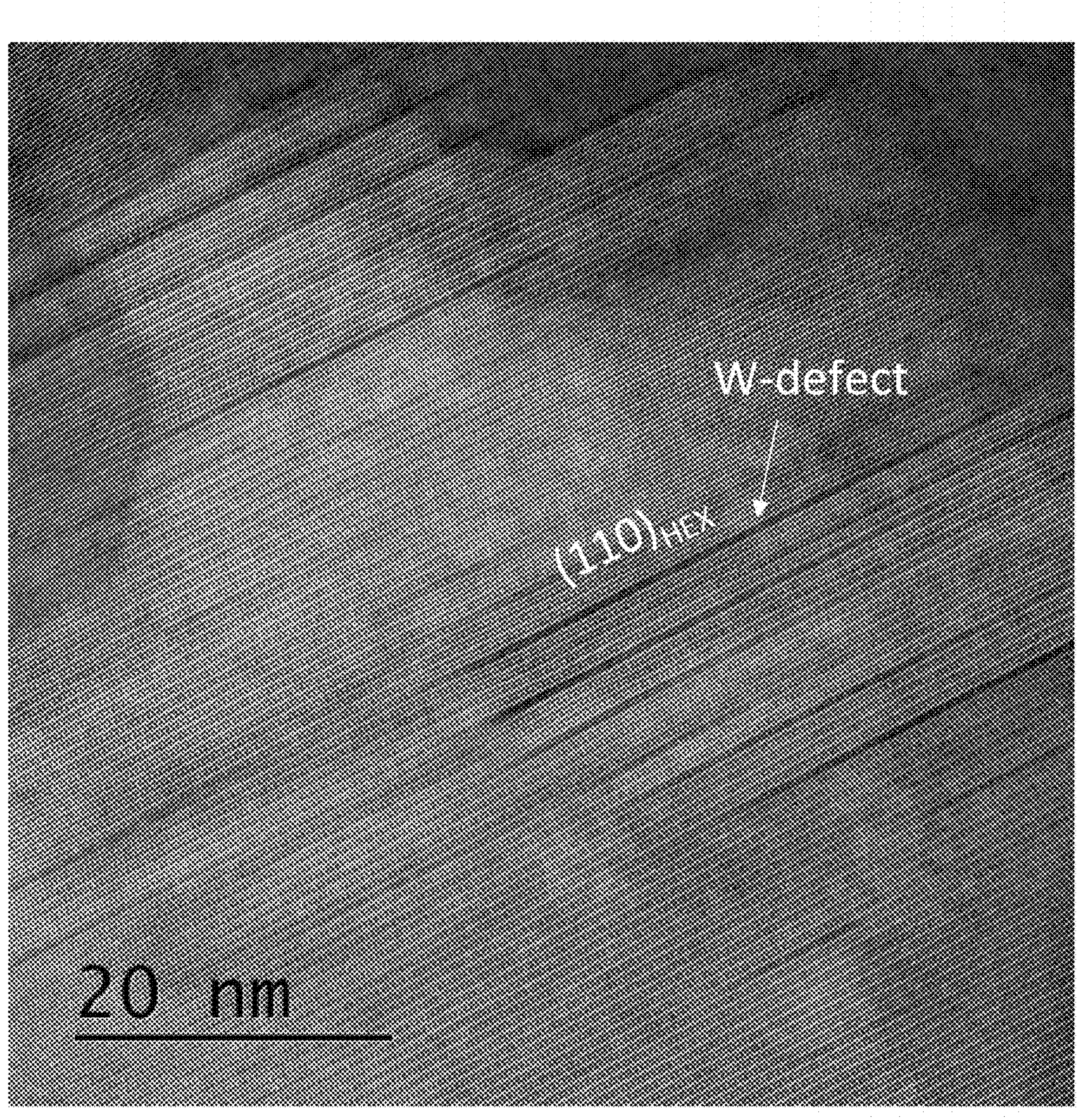
FIG. 6 illustrates a STEM-HAADF image of pseudohexagonal crystal particles of the powder A obtained in Experimental Example 1-1, observed in a [221] crystal zone axis.

A HAADF image of the pseudohexagonal crystal particles observed in a [221] crystal zone axis is illustrated in FIG. 6. In the HAADF mode, atomic particles would be observed with a luminosity proportional to the atomic number and the atom existence probability in the projection direction. Hence, the line-shaped region along $(110)_{HEX}$, which appeared dark in FIG. 6, was identified to be a defect of W, which had the highest atomic number. By an observation in a different direction, the trace of such a W-lost region was confirmed to spread planarly in $(110)_{HEX}$. Moreover, some of the lower-contrast traces were inferred to represent line-shaped shrinkages.

In the present Experimental Example, the heating/reducing process was 5 minutes, which was shorter than in other Experimental Examples described below. In the early period of the high-temperature reduction, a W-defect in the orthorhombic crystal $(010)_{ORTH}$ had shrunk and induced a structural transition to a pseudohexagonal crystal, in which many W-lost regions that had not finished shrinking were observed in the $\{100\}_{HEX}$ planes.

Experimental Example 1-2

The $Cs_4W_{11}O_{35}$ powder, which was the powder A' obtained in Experimental Example 1-1 was densely sprinkled over a carbon boat thinly and flatly, set in a tube furnace, and heated in an Ar gas airflow from room temperature to 800° C. With the temperature maintained at 800° C., and with the airflow changed to an airflow in which 1% of $H_2$ gas was mixed with the carrier Ar gas, the powder was reduced for 15 minutes. Subsequently, only in the Ar gas airflow with the $H_2$ gas stopped, the powder was gradually cooled to 100° C. Subsequently, with the Ar gas airflow stopped, the powder was gradually cooled to room temperature. Then, a powder B was taken out. The color tone of the powder B taken out was blue.

The XRD pattern of the powder B was a two-phase mixed pattern of an orthorhombic crystal and a hexagonal crystal. The lattice constants of each phase were obtained by the Rietveld method. As a result, the lattice constants of the orthorhombic crystal were a=14.6576 Å, b=52.4315 Å, and c=7.7412 Å (hexagonal crystal-translated values were a=7.5088 Å and c=7.7412 Å). The lattice constants of the hexagonal crystal were a=7.4122 Å and c=7.5940 Å. It was confirmed that the c-axis values of these crystals were both in the range of 7.560 Å≤c≤7.750 Å.

Figure 7:
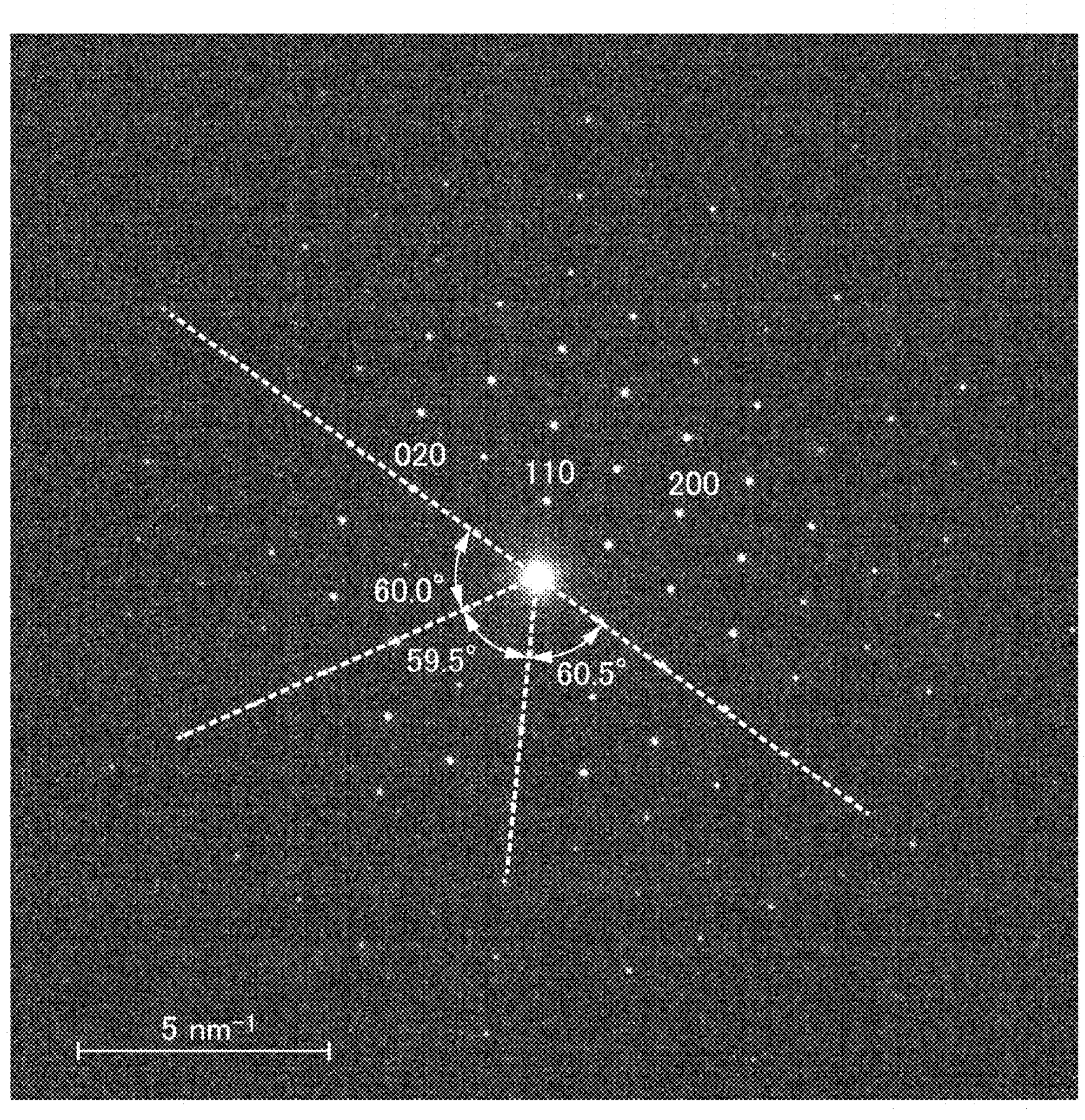
FIG. 7 illustrates an electron beam diffraction image of pseudohexagonal crystal particles of a powder B obtained in Experimental Example 1-2 about a $[001]_{HEX}$ crystal zone axis.

Next, the powder B was observed by TEM. As a result, orthorhombic crystal particles and pseudohexagonal crystal particles were observed, as in the case of the powder A obtained in Experimental Example 1-1. As illustrated by the electron beam diffraction image of FIG. 7 about the [001] HEx crystal zone axis, the pseudohexagonal crystal particles exhibited a diffraction pattern close to that of a hexagonal crystal. Here, the interplanar angle between (200) HEX and (110) HEX measured 59.5°, which was a value very close to that of a hexagonal crystal.

Experimental Example 1-3

The $Cs_4W_{11}O_{35}$ powder, which was the powder A' obtained in Experimental Example 1-1 was densely sprinkled over a carbon boat thinly and flatly, set in a tube furnace, and heated in an Ar gas airflow from room temperature to 800° C. With the temperature maintained at 800° C., and with the airflow changed to an airflow in which 1% of $H_2$ gas was mixed with the carrier Ar gas, the powder was reduced for 30 minutes. Subsequently, only in the Ar gas airflow with the $H_2$ gas stopped, the powder was gradually cooled to 100° C. Subsequently, with the Ar gas airflow stopped, the powder was gradually cooled to room temperature. Then, a powder C was taken out. The color tone of the powder C taken out was dark blue.

The XRD pattern of the powder C was a two-phase mixed pattern of an orthorhombic crystal and a hexagonal crystal. The lattice constants of each phase were obtained by the Rietveld method. As a result, the lattice constants of the orthorhombic crystal were a=14.6649 Å, b=52.4010 Å, and c=7.7451 Å (hexagonal crystal-translated values were a=7.5064 Å and c=7.7451 Å). The lattice constants of the hexagonal crystal were a=7.4076 Å and c=7.6107 Å. It was confirmed that the c-axis values of these crystals were both in the range of 7.560 Å≤c≤7.750 Å.

Figure 8:
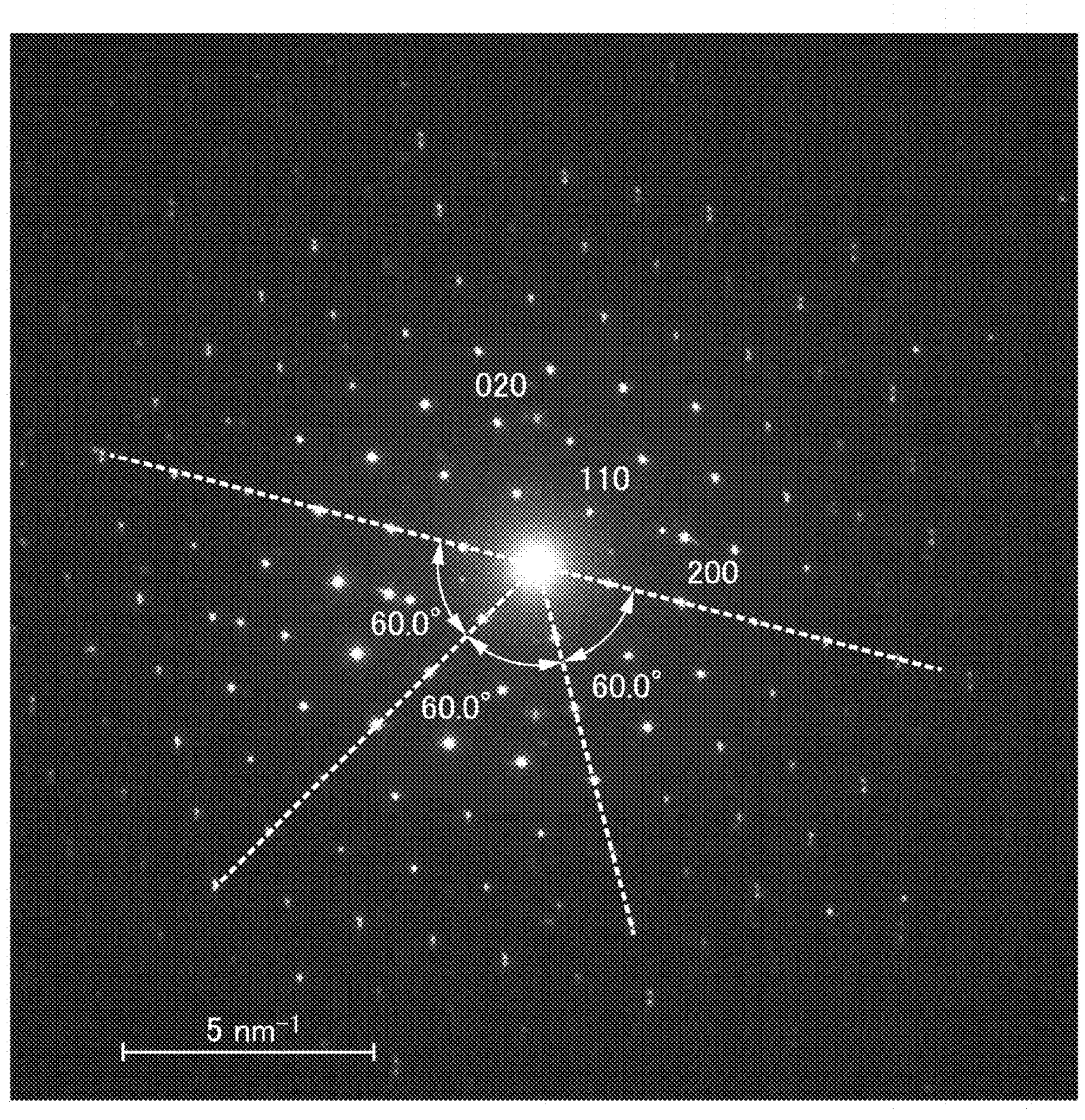
FIG. 8 illustrates an electron beam diffraction image of pseudohexagonal crystal particles of a powder C obtained in Experimental Example 1-3 about a $[001]_{HEX}$ crystal zone axis.

Next, the powder C was observed by TEM. As a result, orthorhombic crystal particles and pseudohexagonal crystal particles were observed, as in the case of the powder A obtained in Experimental Example 1-1. As illustrated by the electron beam diffraction image of FIG. 8 about the crystal zone axis, the pseudohexagonal crystal particles exhibited a diffraction pattern of a hexagonal crystal. Here, the interplanar angle between (200) HEX and (110) HEX measured 60.0°, which was a value of a hexagonal crystal.

Experimental Example 1-4 to Experimental Example 1-7

A powder D, a powder E, a powder F, and a powder G were produced by changing the reduction time for reducing the $Cs_4W_{11}O_{35}$ powder, which was the powder A' obtained in Experimental Example 1-1, to any time in a range of from 35 minutes through 90 minutes as indicated in Table 1. The powder color tones of the powder D to the powder G were all dark blue. The XRD lattice constants were as indicated in the table.

As indicated in Table 1, in Experimental Example 1-4, an orthorhombic crystal phase was also observed, and the hexagonal crystal-translated c-axis length was 7.7440 Å (Experimental Example 1-4).

Experimental Example 1-8 to Experimental Example 1-11

The heating temperature and the reduction time for heating and reducing the $Cs_4W_{11}O_{35}$ powder, which was the powder A' obtained in Experimental Example 1-1, were changed as indicated in Table 1. Specifically, in Experimental Example 1-8, the heating and reducing was performed at 650° C. for 120 minutes. In Experimental Example 1-9, the heating and reducing was performed at 700° C. for 60 minutes. In Experimental Example 1-10, the heating and reducing was performed at 900° C. for 10 minutes. In Experimental Example 1-11, the heating and reducing was performed at 950° C. for 20 minutes. A powder H, a powder I, a powder J, and a powder K were produced in the same manner as in the production of the power A in Experimental Example 1-1 except the point described above. A pale blue powder, a blue powder, a dark blue powder, and a dark blue powder were obtained, respectively. The lattice constants of each powder obtained from the XRD pattern were as indicated in Table 1.

As indicated in Table 1, in Experimental Example 1-8 and Experimental Example 1-9, an orthorhombic crystal phase was also observed, and the hexagonal crystal-translated c-axis lengths were 7.7428 Å (Experimental Example 1-8) and 7.7471 Å (Experimental Example 1-9).

Experimental Example 1-12

Cesium carbonate and tungsten trioxide were mixed at a mole ratio of $Cs_2CO_3:WO_3=3:11$, densely sprinkled over a carbon boat thinly and flatly, set in a tube furnace, and heated at 850° C. for 5 hours, to obtain a white powder very slightly wearing a greenish tone. The main phase of the white powder was identified to be $Cs_6W_{11}O_{36}$ (ICDD1-70-632), but the white powder was a mixed phase with $Cs_4W_{11}O_{35}$.

The obtained white powder was thermally treated in 1% of a $H_2$—$N_2$ airflow at 800° C. for 30 minutes, to obtain a dark blue powder L.

The XRD pattern of the powder L was a two-phase mixed pattern of an orthorhombic crystal and a hexagonal crystal. The lattice constants of the obtained powder L obtained from the XRD pattern were as indicated in Table 1. As described above, an orthorhombic crystal phase was also observed, and the hexagonal crystal-translated c-axis length was 7.7449 Å.

Experimental Example 1-13

Cesium carbonate and tungsten trioxide were mixed at a mole ratio of $Cs_2CO_3:WO_3=1:6$, densely sprinkled over a carbon boat thinly and flatly, set in a tube furnace, and heated at 850° C. for 5 hours, to obtain a white powder very slightly wearing a greenish tone. The main phase of the white powder was identified to be $Cs_4W_{11}O_{35}$, but the white powder was a mixed phase with $Cs_2W_6O_{19}$ (ICDD00-045-0522).

The obtained white powder was thermally treated in 1% of a $H_2$—$N_2$ airflow at 800° C. for 30 minutes, to obtain a dark blue powder M.

The XRD pattern of the powder M was a two-phase mixed pattern of an orthorhombic crystal and a hexagonal crystal. The lattice constants of the obtained powder M obtained from the XRD pattern were as indicated in Table 1. An orthorhombic crystal phase was also observed, and the hexagonal crystal-translated c-axis length was 7.7466 Å.

TABLE 1

| | Powder | Starting raw materials (mole ratio) Cs | W | O | Heating/reducing process Temp. (° C.) | Time (min) | Chemically analyzed composition (at %) Cs | W | O | X-ray diffractometry result Pattern | Hexagonal crystal c-axis (Å) |
|---|---|---|---|---|---|---|---|---|---|---|---|
| Expt. Ex. 1-1 | A | 4 | 11 | 35 | 800 | 5 | 9.18 | 23.4 | 67.4 | ORTH + HEX | 7.5752 |
| Expt. Ex. 1-2 | B | 4 | 11 | 35 | 800 | 15 | 9.16 | 24.6 | 66.2 | ORTH + HEX | 7.5940 |
| Expt. Ex. 1-3 | C | 4 | 11 | 35 | 800 | 30 | 9.27 | 25.0 | 65.8 | ORTH + HEX | 7.6107 |
| Expt. Ex. 1-4 | D | 4 | 11 | 35 | 800 | 35 | 9.25 | 24.9 | 65.9 | ORTH + HEX | 7.6121 |
| Expt. Ex. 1-5 | E | 4 | 11 | 35 | 800 | 40 | 9.29 | 24.9 | 65.8 | HEX | 7.6118 |

TABLE 1-continued

| | Powder | Starting raw materials (mole ratio) Cs | W | O | Heating/reducing process Temp. (° C.) | Time (min) | Chemically analyzed composition (at %) Cs | W | O | X-ray diffractometry result Pattern | Hexagonal crystal c-axis (Å) |
|---|---|---|---|---|---|---|---|---|---|---|---|
| Expt. Ex. 1-6 | F | 4 | 11 | 35 | 800 | 60 | 9.30 | 25.3 | 65.4 | HEX | 7.6121 |
| Expt. Ex. 1-7 | G | 4 | 11 | 35 | 800 | 90 | 9.27 | 25.0 | 65.8 | HEX | 7.6119 |
| Expt. Ex. 1-8 | H | 4 | 11 | 35 | 650 | 120 | 9.17 | 23.6 | 67.2 | ORTH + HEX | 7.5765 |
| Expt. Ex. 1-9 | I | 4 | 11 | 35 | 700 | 60 | 9.19 | 24.2 | 66.6 | ORTH + HEX | 7.5829 |
| Expt. Ex. 1-10 | J | 4 | 11 | 35 | 900 | 10 | 9.26 | 25.0 | 65.7 | HEX | 7.5917 |
| Expt. Ex. 1-11 | K | 4 | 11 | 35 | 950 | 20 | 9.28 | 25.2 | 65.5 | HEX | 7.6115 |
| Expt. Ex. 1-12 | L | 6 | 11 | 36 | 800 | 30 | 10.30 | 23.9 | 65.8 | ORTH + HEX | 7.6027 |
| Expt. Ex. 1-13 | M | 2 | 6 | 19 | 800 | 30 | 8.97 | 25.4 | 65.6 | ORTH + HEX | 7.6081 |

As shown by Experimental Example 1-1 to Experimental Example 1-13 described above, the $Cs_4W_{11}O_{35}$ white powders containing $Cs_4W_{11}O_{35}$, $Cs_6W_{11}O_{36}$, or $Cs_2W_6O_{19}$ gradually changed the powder color from pale blue to blue, and to dark blue as they were reduced at a high temperature.

The $Cs_6W_{11}O_{35}$ phase in which lattice defects including W loss were present was an orthorhombic crystal. It was confirmed that through reduction at a high temperature, this orthorhombic crystal changed to a hexagonal crystal as the lattice defects including W loss were decreased and eliminated.

It was confirmed that all of the cesium tungsten oxides contained in the powder A to the powder M obtained in Experimental Example 1-1 to Experimental Example 1-13 had W loss and O loss.

Experimental Example 2

A near-infrared absorptive/curable ink composition and a near-infrared absorbed/cured film (hereinafter, may simply be referred to as "cured film") were produced using the near-infrared absorbing particles produced in Experimental Example 1, and evaluated.

Experimental Example 2-1 to Experimental Example 2-14 were Examples, and Experimental Example 2-15 and Experimental Example 2-16 were Comparative Examples.

Experimental Example 2-1

The powder A produced in Experimental Example 1-1 was weighed out to 20% by mass, an acrylic-based polymeric dispersant containing amine as a functional group (hereinafter, abbreviated as "dispersant a") was weighed out to 20% by mass, and methyl isobutyl ketone serving as a solvent was weighed out to 60% by mass. The weighed-out materials were added into a glass container together with silica beads having diameter of 0.3 mm, and dispersed and pulverized for 1 hour using a paint shaker, to obtain a dispersion liquid A.

The average particle diameter of the near-infrared absorbing particles in the dispersion liquid A (i.e., a dispersed particle diameter measured using ELS-8000 obtained from Otsuka Electronics Co., Ltd., which was a particle diameter measuring instrument based on a dynamic light scattering method) measured 28.2 nm.

The dispersion liquid A (25 parts by mass), and a commercially-available one-pack thermosetting ink containing an uncured thermosetting resin (obtained from Teikoku Printing Inks Mfg. Co., Ltd., a MEG screen ink (medium)) (75 parts by mass) were mixed, to prepare a near-infrared curable ink composition (hereinafter, referred to as ink A) according to Experimental Example 2-1.

The ink A was applied over a blue plate glass having a thickness of 3 mm using a bar coater (No. 10), to form a coating film (coating step).

Next, the coating film was irradiated with near-infrared rays, to obtain a near-infrared cured film (hereinafter, referred to as cured film A) (curing step).

In the curing step, a line heater HYP-14N (having a power of 980 W) obtained from Hybec Corporation was used as the near-infrared irradiation source. With the heater set at a height of 5 cm from the coated surface of the coating film, the coating film was irradiated with near-infrared rays for 10 seconds.

The film thickness of the obtained cured film A was 20 μm. The cured film A was confirmed to be transparent by visual observation.

The average particle diameter of the cesium tungsten oxide particles dispersed in the cured film A, calculated using an image processing device employing a transmission electron microscope, was 24 nm. The diameter of the circumscribed circle of each particle was regarded as the particle diameter of the particle, and the average particle diameter was calculated as the average of particle diameters measured with 100 particles.

The close adhesiveness of the cured film A was evaluated by the method described below.

Using a cutter guide having a gap interval of 1 mm, a hundred grid square-shaped scars were cut in the cured film A. Then, a tape having a width of 18 mm (CELLOTAPE (registered trademark) CT-18 obtained from Nichiban Co., Ltd.) was pasted on the grid square shape scarred-surface, and a 2.0 kg roller was run back and forth over them 20 times to completely bond them with each other. Subsequently, they were rapidly peeled from each other at a peel angle of 180 degrees, to count the number of grid squares that would be peeled off. The number of grid squares that were peeled off was 0.

The cured film A did not re-melt when the cured film was irradiated for 20 seconds with near-infrared rays of the same condition as in the curing of the near-infrared curable ink described above.

The spectral characteristics of the produced cured film A were measured using a spectrophotometer obtained from Hitachi, Ltd. as a reflectance of light having a wavelength of from 200 nm or longer and 2,100 nm or shorter, to calculate color indices, which were L*=88, a*=−1, and b*=8. Hence, it was confirmed that the color tone was extremely poorly bluish, and was neutral.

The result is indicated in Table 2. Table 2 also indicates the results obtained in Experimental Example 2-2 to Experimental Example 2-16 described below.

Experimental Example 2-2 to Experimental Example 2-13

Near-infrared curable ink compositions and cured films of Experimental Example 2-2 to Experimental Example 2-13 were obtained in the same manner as in Experimental Example 2-1 except that the powder B to the powder M prepared in Experimental Example 1-2 to Experimental Example 1-13 were used instead of the powder A, and evaluated. The evaluation results are indicated in Table 2.

Experimental Example 2-14

A near-infrared curable ink composition and a cured film of Experimental Example 2-14 were obtained in the same manner as in Experimental Example 2-1 except that instead of the thermosetting resin of Experimental Example 2-1, an acrylic resin dissolved in methyl isobutyl ketone was used as a thermoplastic resin, and evaluated. The evaluation results are indicated in Table 2.

Experimental Example 2-15

A near-infrared curable ink composition and a cured film of Experimental Example 2-15 were obtained in the same manner as in Experimental Example 2-1 except that the $Cs_4W_{11}O_{35}$ powder, which was the powder A' obtained in Experimental Example 1-1, was used instead of the powder A, and evaluated. The evaluation results are indicated in Table 2.

Experimental Example 2-16

A cesium carbonate ($Cs_2CO_3$) aqueous solution, tungstic acid ($H_2WO_4$), and a tungsten dioxide powder ($WO_2$) were weighed out such that a $Cs_2O \cdot 5WO_3 \cdot 4WO_2$ composition would be obtained, and mixed and kneaded, to prepare a raw material mixture. After the materials were sufficiently mixed, the raw material mixture was densely sprinkled over a carbon boat thinly and flatly, maintained in a 1% of $H_2$ gas airflow carried by $N_2$ gas at 550° C. for 60 minutes, subsequently maintained in an airflow changed to 100% of $N_2$ for 1 hour, subsequently subjected to temperature raising to 800° C. and maintained at the temperature for 1 hour, and gradually cooled to room temperature, to obtain a powder 0. The color of the powder O was dark blue. As a result of a chemical analysis, a composition $Cs_{0.33}WO_{2.74}$ Was obtained.

The XRD pattern of the powder O exhibited a hexagonal crystal single phase. By the Rietveld analysis, lattice constants were obtained to be a=7.4088 Å and c=7.6033 Å. The lattice constant c-axis value was in the preferable value range.

Next, TEM observation was performed. As a result, no particularly outstanding lattice defects were observed. Also, in STEM atomic image observation, no outstanding lattice defects were observed, and no W loss was observed, either.

A near-infrared curable ink composition and a cured film of Experimental Example 2-16 were obtained in the same manner as in Experimental Example 2-1 except that the $Cs_{0.33}WO_{2.74}$ powder was used instead of the powder A, and evaluated. The evaluation results are indicated in Table 2.

TABLE 2

| | Near infrared absorbing particles | Resin | Cured film evaluation results: Close adhesiveness [Number] | Color index L* | a* | b* |
|---|---|---|---|---|---|---|
| Expt. Ex. 2-1 | Powder A | Thermosetting resin | 0 | 88 | −1 | 8 |
| Expt. Ex. 2-2 | Powder B | Thermosetting resin | 0 | 88 | −1 | 8 |
| Expt. Ex. 2-3 | Powder C | Thermosetting resin | 0 | 88 | −1 | 8 |
| Expt. Ex. 2-4 | Powder D | Thermosetting resin | 0 | 88 | −1 | 8 |
| Expt. Ex. 2-5 | Powder E | Thermosetting resin | 0 | 88 | −1 | 8 |
| Expt. Ex. 2-6 | Powder F | Thermosetting resin | 0 | 88 | −1 | 8 |
| Expt. Ex. 2-7 | Powder G | Thermosetting resin | 0 | 88 | −1 | 8 |
| Expt. Ex. 2-8 | Powder H | Thermosetting resin | 0 | 88 | −1 | 8 |
| Expt. Ex. 2-9 | Powder I | Thermosetting resin | 0 | 88 | −1 | 8 |
| Expt. Ex. 2-10 | Powder J | Thermosetting resin | 0 | 88 | −1 | 8 |
| Expt. Ex. 2-11 | Powder K | Thermosetting resin | 0 | 88 | −1 | 8 |
| Expt. Ex. 2-12 | Powder L | Thermosetting resin | 0 | 88 | −1 | 8 |
| Expt. Ex. 2-13 | Powder M | Thermosetting resin | 0 | 88 | −1 | 8 |
| Expt. Ex. 2-14 | Powder A | Thermoplastic resin | 0 | 88 | −1 | 8 |
| Expt. Ex. 2-15 | Powder A' | Thermosetting resin | 25 | 88 | −1 | 8 |
| Expt. Ex. 2-16 | Powder O | Thermosetting resin | 0 | 88 | −1 | −4 |

According to the results indicated in Table 2, it was successfully confirmed that the cured films produced using the near-infrared curable ink compositions of Experimental Example 2-1 to Experimental Example 2-14 containing the near-infrared absorbing particles containing cesium tungsten oxides that had an orthorhombic or hexagonal crystal structure and were represented by the general formula: $Cs_xW_{1-y}O_{3-z}$ (where $0.2 \leq x \leq 0.4$, $0<y \leq 0.4$, $0<z \leq 0.46$) had color tones that were extremely poorly bluish and were neutral. That is, it was successfully confirmed that the coating films of these Experimental Examples contained the near-infrared absorbing particles containing the complex tungsten oxides and were able to have more neutral color tones.

As compared with this, the near-infrared absorbing particles contained in the cured films of Experimental Example 2-15 and Experimental Example 2-16 were free of cesium tungsten oxides satisfying the general formula above.

The cured film of Experimental Example 2-16 had a negative b* value, from which it can be known that a blue color tone would be clearly recognized. That is, it was successfully confirmed that the coating film of Experimental Example 2-16 was unable to have a neutral color tone.

It was successfully confirmed that the coating film of Experimental Example 2-15 had a poor close adhesiveness as clear from the result of Table 2, although it was able to achieve a neutral color tone. This was considered to be due to a low solar radiation absorbance of the near-infrared absorbing particles contained in the near-infrared curable ink composition used in Experimental Example 2-15.

The present application claims priority to Japanese Patent Application No. 2021-124045 filed with the Japan Patent Office on Jul. 29, 2021, and the entire contents of Japanese Patent Application No. 2021-124045 are incorporated herein by reference.

The invention claimed is:

1. A near-infrared curable ink composition, comprising:

a thermosetting resin or a thermoplastic resin; and near-infrared absorbing particles, wherein the near-infrared absorbing particles contain a cesium tungsten oxide having an orthorhombic or hexagonal crystal structure and represented by a general formula: $Cs_xW_{1-y}O_{3-z}$ (where $0.2 \leq x \leq 0.4$, $0<y \leq 0.4$, $0<z \leq 0.46$), the cesium tungsten oxide contains a line-shaped or plane-shaped defect on one or more planes selected from orthorhombic (010) planes, hexagonal {100} prismatic planes, and hexagonal (001) basal planes, and the near-infrared absorbing particles are particles obtained by heating and reducing a powder of a crystal of a cesium tungsten oxide precursor $nCs_2O \cdot mWO_3$ (where n and m are integers, $3.6 \leq m/n \leq 9.0$) in a reductive gas atmosphere at 650° C. or higher and 950° C. or lower.

2. The near-infrared curable ink composition according to claim 1, wherein the cesium tungsten oxide contains a defect, and the defect includes tungsten loss.

3. The near-infrared curable ink composition according to claim 1, wherein a c-axis length of the cesium tungsten oxide is 7.560 Å or greater and 7.750 Å or less, the c-axis length being a value translated in terms of a hexagonal crystal.

4. The near-infrared curable ink composition according to claim 1, wherein some O of a $WO_6$ octahedron forming a crystal of the cesium tungsten oxide are lost.

5. The near-infrared curable ink composition according to claim 1, wherein some Cs of the cesium tungsten oxide are replaced with an additive element, and the additive element is one or more selected from Na, Tl, In, Li, Be, Mg, Ca, Sr, Ba, Al, and Ga.

6. The near-infrared curable ink composition according to claim 1, wherein an average particle diameter of the near-infrared absorbing particles is 0.1 nm or greater and 200 nm or less.

7. The near-infrared curable ink composition according to claim 1, wherein a surface of the near-infrared absorbing particles is coated with a compound containing one or more kinds of atoms selected from Si, Ti, Zr, Al, and Zn.

8. The near-infrared curable ink composition according to claim 1, wherein the near-infrared absorbing particles are particles obtained by heating and reducing a cesium tungsten oxide precursor containing a $Cs_4W_{11}O_{35}$ phase as a main phase in a reductive gas atmosphere at 650° C. or higher and 950° C. or lower.

9. The near-infrared curable ink composition according to claim 1, further comprising:

one or more selected from organic pigments, inorganic pigments, and dyes.

10. The near-infrared curable ink composition according to claim 1, further comprising:

a dispersant.

11. The near-infrared curable ink composition according to claim 1, further comprising:

a solvent.

12. A near-infrared cured film, the near-infrared cured film being a cured product of the near-infrared curable ink composition of claim 1.

13. A method for producing a near-infrared cured product, the method comprising:

applying the near-infrared curable ink composition of claim 1 over a base material, to form a coating film; and irradiating the coating film with near-infrared rays, to cure the near-infrared curable ink composition.

* * * * *